US012617202B2

(12) United States Patent
Nishikawa et al.

(10) Patent No.: US 12,617,202 B2
(45) Date of Patent: May 5, 2026

(54) DRIVE WAVEFORM CREATION METHOD, INFORMATION PROCESSING APPARATUS, AND PROGRAM

(71) Applicant: FUJIFILM Corporation, Tokyo (JP)

(72) Inventors: Baku Nishikawa, Kanagawa (JP); Yuta Mizouchi, Kanagawa (JP); Yusuke Watada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 174 days.

(21) Appl. No.: 18/522,280

(22) Filed: Nov. 29, 2023

(65) Prior Publication Data

US 2024/0198666 A1 Jun. 20, 2024

(30) Foreign Application Priority Data

Dec. 14, 2022 (JP) ................................ 2022-199620

(51) Int. Cl.
*B41J 2/045* (2006.01)

(52) U.S. Cl.
CPC ....... *B41J 2/04588* (2013.01); *B41J 2/04535* (2013.01); *B41J 2/04581* (2013.01)

(58) Field of Classification Search
None
See application file for complete search history.

(56) References Cited

U.S. PATENT DOCUMENTS

2022/0022798 A1* 1/2022 Soon-Shiong ......... G06N 3/088

FOREIGN PATENT DOCUMENTS

| | | | | |
|---|---|---|---|---|
| EP | 3160750 B1 * | 12/2021 | ........... | B41J 29/393 |
| JP | 2021050730 A * | 4/2021 | | |
| JP | 2021160314 | 10/2021 | | |
| WO | WO-2021261806 A1 * | 12/2021 | .......... | B41J 2/04571 |

OTHER PUBLICATIONS

Mori, Machine TranslationofJP-2021050730-A, 2021 (Year: 2021).*
Kim, Machine TranslationofWO-2021261806-A1, 2021 (Year: 2021).*

* cited by examiner

*Primary Examiner* — Scott A Richmond
(74) *Attorney, Agent, or Firm* — JCIPRNET

(57) ABSTRACT

A drive waveform creation method, an information processing apparatus, and a program that enable even a technician not having professional knowledge to efficiently create a drive waveform suitable for ejecting liquid to be used.

A method of creating a drive waveform to be used for driving a piezoelectric element of a liquid ejection head including the piezoelectric element includes, via one or more processors, predicting flight of liquid to be ejected by the liquid ejection head in a case of inputting an unknown drive waveform using a machine learning model that is trained through machine learning using data related to an actual flight shape of the liquid in a case where each of a plurality of drive waveforms is applied to the piezoelectric element using the liquid and the liquid ejection head, and determining a drive waveform suitable for ejecting the liquid based on the prediction of the flight.

20 Claims, 17 Drawing Sheets

DRIVE WAVEFORM CREATION METHOD, INFORMATION PROCESSING APPARATUS, AND PROGRAM

CROSS-REFERENCE TO RELATED APPLICATION

The present application claims priority under 35 U.S.C. § 119(a) to Japanese Patent Application No. 2022-199620 filed on Dec. 14, 2022, which is hereby expressly incorporated by reference, in its entirety, into the present application.

BACKGROUND OF THE INVENTION

1. Field of the Invention

The present disclosure relates to a drive waveform creation method, an information processing apparatus, and a program, and particularly to a technology for creating a drive waveform to be applied to a liquid ejection head that ejects liquid by driving a piezoelectric element, and to an information processing technology for executing processing thereof.

2. Description of the Related Art

In ink jet printing, in a case where ink to be used varies, a flight shape of ink ejected from an ink jet head changes even with a slight change in a physical property value. Thus, it has been a major object to acquire a favorable ejection characteristic. The ejection characteristic may include, for example, landing position accuracy, whether or not a satellite droplet is present, a droplet speed, a droplet amount, and stability. Since the ink jet head that ejects ink by driving a piezoelectric element has a degree of freedom in a drive waveform, a developer generally executes optimization of the drive waveform for each ink to be used.

JP2021-160314A discloses a system including an apparatus that ejects a liquid material via an ink jet head, in which the ejecting apparatus includes a unit that acquires identification information of the ink jet head, a unit that supplies a drive pulse for ejecting the liquid material to an actuator of the ink jet head, and a test unit that detects a state of a liquid droplet ejected from the ink jet head. The system further includes a database in which ejection characteristics of individual ink jet heads and identification information of individual ink jet heads are associated with each other, and an optimization unit that provides first optimization information for generating an optimized drive pulse with respect to a tentative attribute assumed with respect to the liquid material to be ejected by the ejecting apparatus based on the ejection characteristic of the ink jet head acquired using the identification information. The optimization unit includes a dynamic optimization unit that detects the state of the liquid droplet ejected using the drive pulse generated based on the first optimization information via the test unit, assumes an actual attribute related to ejection of the liquid material to be ejected based on the ejection characteristic of the ink jet head obtained using the identification information, and provides second optimization information for dynamically optimizing the drive pulse with respect to the assumed actual attribute.

SUMMARY OF THE INVENTION

In order to optimize the drive waveform with respect to ink to be used, a method of predicting a flight shape of the ink with respect to input of the drive waveform using a physical simulation technique such as an equivalent circuit model or computational fluid dynamics (CFD) has been generally used in the related art. However, in such a method, it is difficult to construct a model used in prediction without high-level knowledge and experience related to fluid dynamics and computation.

In addition, a method of determining an optimal drive waveform satisfying a condition of a desired characteristic by selecting a drive waveform from a drive waveform group prepared in advance and evaluating a characteristic of the drive waveform is generally used as a technique of optimizing the drive waveform. However, optimization that accompanies trial and error requires an enormous amount of time. Attempts to shorten a time required for optimizing the drive waveform have been made so far. However, in the general method of the related art, the prepared drive waveform group is limited, and it is impossible to search for a completely unknown drive waveform.

The above object is not limited to an ink jet apparatus for printing application and is a common object for apparatuses using a liquid ejection head that ejects various types of functional liquid.

The present disclosure is conceived in view of such circumstances, and an object thereof is to provide a drive waveform creation method, an information processing apparatus, and a program that enable a technician not having high-level knowledge and experience related to creating a drive waveform to efficiently create a drive waveform suitable for ejecting ink to be used.

A drive waveform creation method according to a first aspect of the present disclosure is a method of creating a drive waveform to be used for driving a piezoelectric element of a liquid ejection head including the piezoelectric element, the drive waveform creation method comprising, via one or more processors, predicting flight of liquid to be ejected by the liquid ejection head in a case of inputting an unknown drive waveform using a machine learning model that is trained through machine learning using data related to an actual flight shape of the liquid in a case where each of a plurality of drive waveforms is applied to the piezoelectric element using the liquid and the liquid ejection head, and determining a drive waveform suitable for ejecting the liquid based on the prediction of the flight.

According to the first aspect, by using the trained machine learning model that has learned a relationship between the drive waveform and a flight shape through machine learning using the data related to the actual flight shape, prediction related to the flight shape with respect to the unknown drive waveform can be performed, and the drive waveform suitable for ejecting the liquid can be efficiently found based on the prediction of the flight.

A drive waveform creation method according to a second aspect is provided such that in the drive waveform creation method according to the first aspect, a parameter of the drive waveform may be configured to include at least one of a pulse width, a slope, a pulse height, or a pulse interval.

A drive waveform creation method according to a third aspect is provided such that in the drive waveform creation method according to the first or second aspect, a learning phase of the machine learning model may be configured to include a step of compressing each of the plurality of drive waveforms into a latent space in smaller dimensions than dimensions of the drive waveform.

A drive waveform creation method according to a fourth aspect is provided such that in the drive waveform creation method according to the third aspect, the drive waveform may be configured to be converted into coordinates in the latent space by inputting the drive waveform into an autoencoder.

A drive waveform creation method according to a fifth aspect is provided such that in the drive waveform creation method according to the third or fourth aspect, in the learning phase, the machine learning model may be configured to be trained to predict an evaluation value based on the actual flight shape in a case of applying the drive waveform using a correspondence relationship between the coordinates of each of the plurality of drive waveforms in the latent space and the evaluation value.

A drive waveform creation method according to a sixth aspect is provided such that in the drive waveform creation method according to the fifth aspect, the data related to the actual flight shape may be configured to include the evaluation value indicating a characteristic extracted from an image in which the actual flight shape is imaged.

A drive waveform creation method according to a seventh aspect is provided such that in the drive waveform creation method according to the fifth or sixth aspect, the evaluation value may be configured to include at least one value indicating a droplet speed, a droplet amount, or whether or not a satellite droplet is present for the liquid ejected from the liquid ejection head.

A drive waveform creation method according to an eighth aspect is provided such that in the drive waveform creation method according to any one of the fifth to seventh aspects, the prediction of the flight may include prediction of the evaluation value, and the one or more processors may be configured to generate one or more of the unknown drive waveforms different from the plurality of drive waveforms, calculate coordinates in the latent space from the unknown drive waveform, calculate the evaluation value predicted from the coordinates of the unknown drive waveform in the latent space using the machine learning model, and determine a drive waveform satisfying a target value by comparing the evaluation value calculated using the machine learning model and the target value with each other.

A drive waveform creation method according to a ninth aspect is provided such that in the drive waveform creation method according to any one of the fifth to eighth aspects, the machine learning model may be a model that outputs an average value and a standard deviation of the evaluation value predicted from the coordinates in the latent space.

A drive waveform creation method according to a tenth aspect is provided such that in the drive waveform creation method according to the ninth aspect, the one or more processors may be configured to generate one or more of the unknown drive waveforms different from the plurality of drive waveforms, calculate coordinates in the latent space from the unknown drive waveform, calculate the average value and the standard deviation of the evaluation value predicted from the coordinates in the latent space using the machine learning model, calculate a probability of the evaluation value exceeding a target value from the average value and the standard deviation of the evaluation value calculated using the machine learning model, and determine a drive waveform of which the probability of exceeding the target value is high as a proper drive waveform.

A drive waveform creation method according to an eleventh aspect is provided such that in the drive waveform creation method according to any one of the eighth to tenth aspects, the one or more processors may be configured to calculate the coordinates in the latent space from the unknown drive waveform using an autoencoder.

A drive waveform creation method according to a twelfth aspect is provided such that in the drive waveform creation method according to any one of the first to eleventh aspects, the one or more processors may be configured to generate a plurality of the unknown drive waveforms different from the plurality of drive waveforms by randomly extracting a value of a parameter of the drive waveform based on a uniform distribution and predict the flight using the machine learning model with respect to each drive waveform.

A drive waveform creation method according to a thirteenth aspect is provided such that in the drive waveform creation method according to any one of the fifth to eleventh aspects, the one or more processors may be configured to, in a case of generating a plurality of the unknown drive waveforms different from the plurality of drive waveforms by randomly extracting a value of a parameter of the drive waveform based on a uniform distribution, clarify a relationship between a distance on the latent space and a variance of the evaluation value in advance through variogram analysis and set a search interval of the drive waveform based on the variogram analysis.

A drive waveform creation method according to a fourteenth aspect is provided such that in the drive waveform creation method according to the thirteenth aspect, the search interval may be configured to be set to be greater than or equal to a distance in which the distance on the latent space and the variance of the evaluation value become uncorrelated with each other based on the variogram analysis.

An information processing apparatus according to a fifteenth aspect of the present disclosure is an information processing apparatus that executes the drive waveform creation method according to any one of the first to fourteenth aspects, the information processing apparatus comprising the one or more processors, and one or more storage devices in which the machine learning model is stored.

A program according to a sixteenth aspect of the present disclosure causes a computer to execute the drive waveform creation method according to any one of the first to fourteenth aspects.

According to the present disclosure, even a technician not having professional knowledge with respect to creation of the drive waveform to be used in the liquid ejection head including the piezoelectric element can efficiently create the drive waveform suitable for ejecting the liquid to be used.

DESCRIPTION OF THE PREFERRED EMBODIMENTS

Hereinafter, an embodiment of the present invention will be described in detail in accordance with the accompanying drawings.

Summary of Drive Waveform Creation Method According to Embodiment

In the present embodiment, examples of a method and an apparatus for creating a machine learning model that predicts behavior of an ink jet head comprising a piezoelectric element, and a method and an apparatus for searching for a drive waveform that may implement a desired characteristic using the trained machine learning model will be described.

Figure 1:
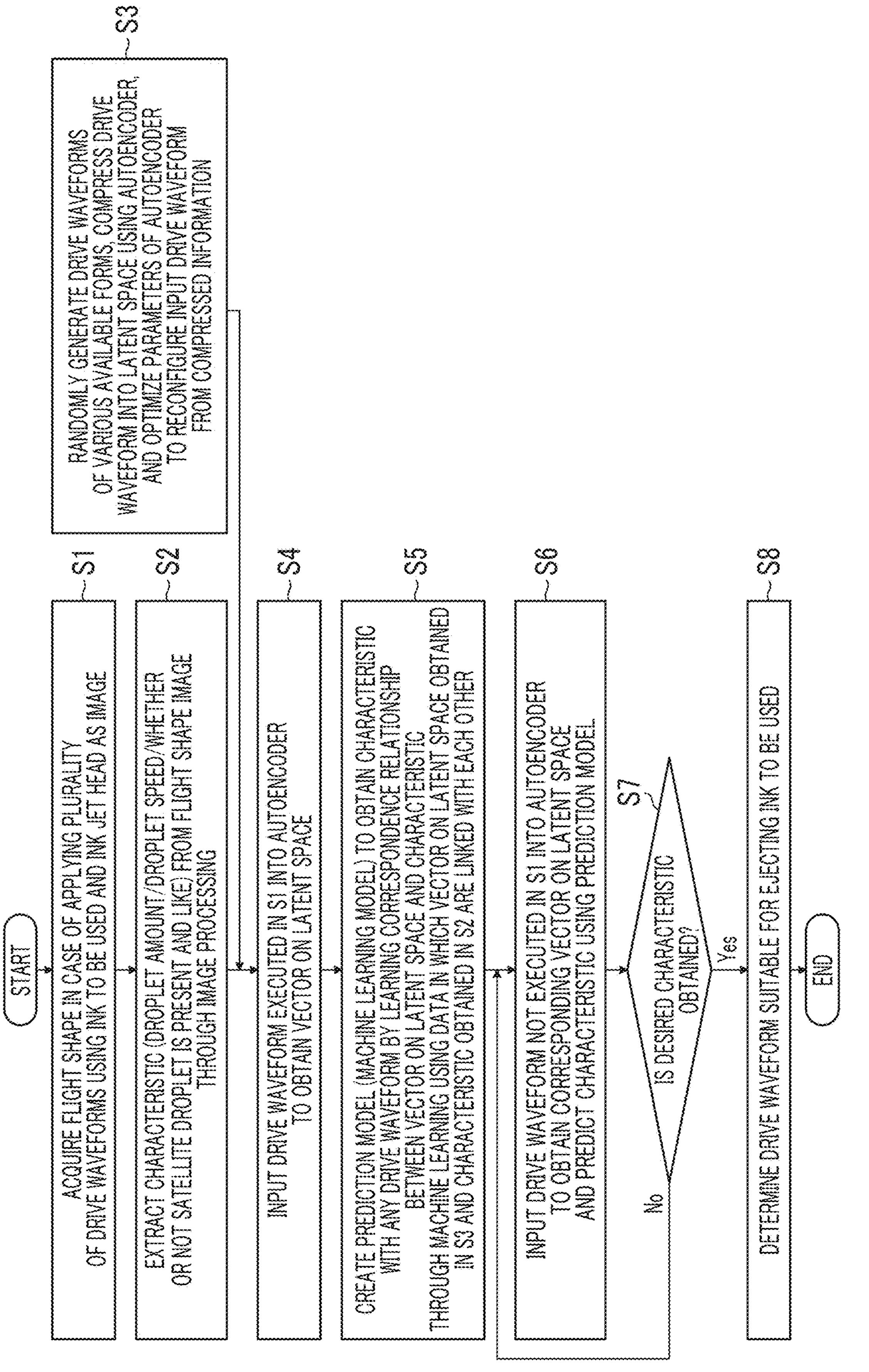
FIG. 1 is a flowchart illustrating a processing procedure of a drive waveform creation method according to an embodiment.

FIG. 1 is a flowchart illustrating a processing procedure of a drive waveform creation method according to the embodiment. Each step of steps S1 to S8 illustrated in FIG. 1 is executed by one or more processors. Step S1 to step S5 are steps of processing of creating a prediction model (machine learning model) using data related to an actual flight shape in the case of ejecting ink by applying each of a plurality of drive waveforms to the piezoelectric element based on an ejection experiment using a combination of the ink to be used and the ink jet head. Step S6 to step S8 are steps of processing of searching for a proper drive waveform using the trained prediction model. Step S1 to step S5 correspond to a learning phase, and step S6 corresponds to an inference phase.

Here, an example of executing step S1 to step S5 via a first processor and then executing step S6 to step S8 via a second processor different from the first processor will be described. However, for example, the first processor may also execute step S6 to step S8 instead of the second processor. In addition, a third processor different from the second processor may execute step S3 instead of the first processor. Hereinafter, each of step S1 to step S8 will be described in detail.

Step S1: Acquisition of Image in Which Actual Flight Shape is Imaged

In step S1, the first processor acquires an image (hereinafter, referred to as a "flight shape image") in which the flight shape in the case of applying each of the plurality of drive waveforms to the piezoelectric element using the ink to be used and the ink jet head is imaged. In the present embodiment, the ejection experiment is conducted by actually applying the plurality of drive waveforms using the combination of the ink to be used and the ink jet head, and multiple pieces of data of a correspondence relationship between the drive waveform as input in the ejection experiment and the actual flight shape of the ink as output are collected.

Example of Drive Waveform

Figure 2:
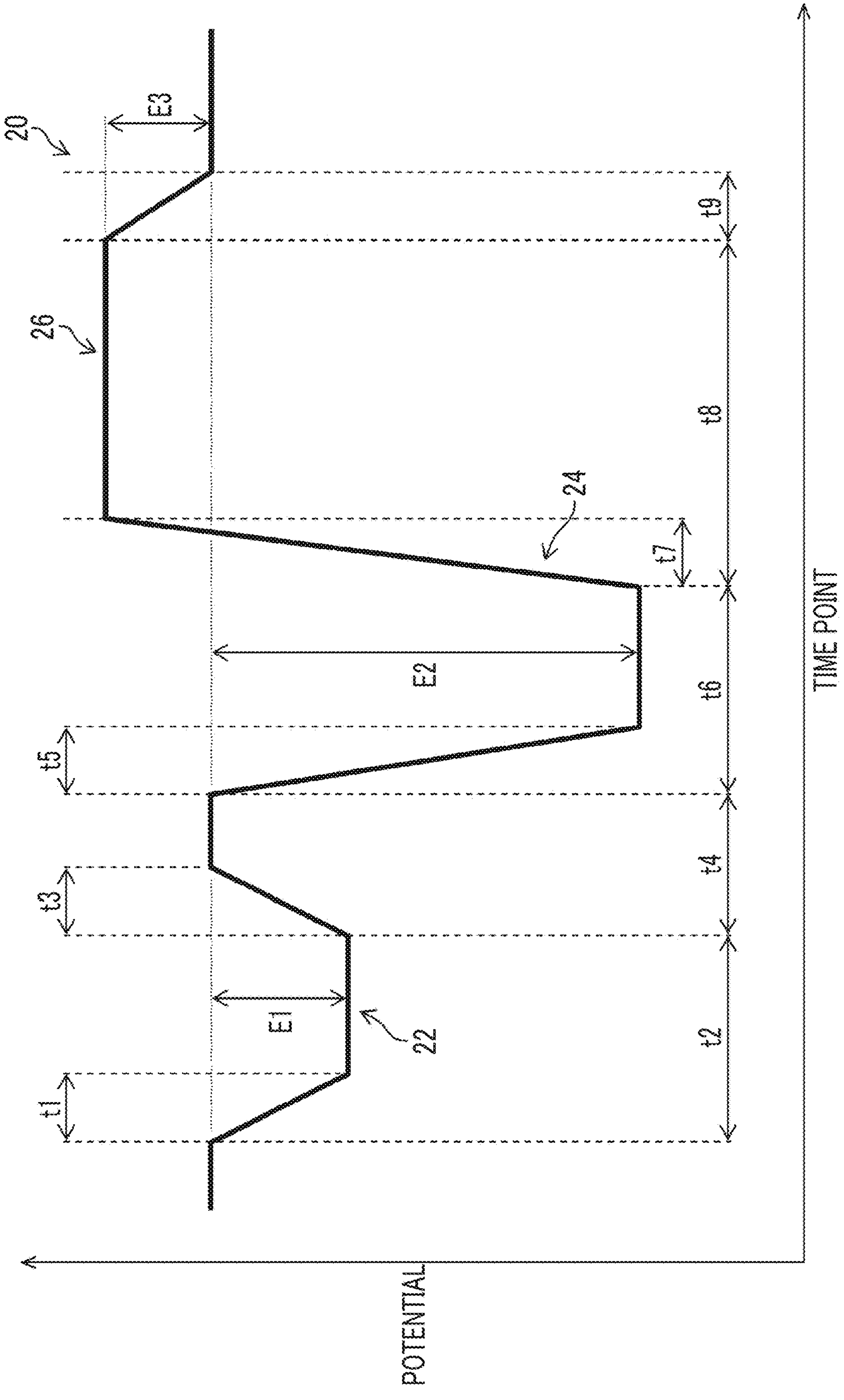
FIG. 2 is a waveform diagram illustrating an example of a drive waveform.

FIG. 2 is a waveform diagram illustrating an example of a drive waveform. A horizontal axis denotes a time point, and a vertical axis denotes a potential. A drive waveform 20 illustrated in FIG. 2 includes a preliminary vibration pulse 22, an ejection pulse 24, and a residual effect suppression pulse 26. A pulse width, a slope, a pulse height, and a pulse interval of each of the preliminary vibration pulse 22, the ejection pulse 24, and the residual effect suppression pulse 26 are parameters of the drive waveform. Here, an example of representing the drive waveform with 12 parameters will be described. In the example of the drive waveform 20 illustrated in FIG. 2, there are 12 parameters including times t1 to t9 for defining the pulse widths, the slopes, and the pulse intervals and potential differences E1 to E3 for defining the pulse heights. A plurality of drive waveforms having different combinations of values of the parameters are applied to the piezoelectric element of the ink jet head filled with the ink to be used, and the flight shape of the ejected ink is used as the learning data.

The parameters of the drive waveform are not limited to the types (12 types) in the example illustrated in FIG. 2. For example, the potential of the drive waveform may be changed in a curved manner together with the time point, and a shape of a curve may be included in the parameters. Types of the drive waveforms to be used in learning may be, for example, 100 types.

Example of Flight Shape Image

Figure 3:
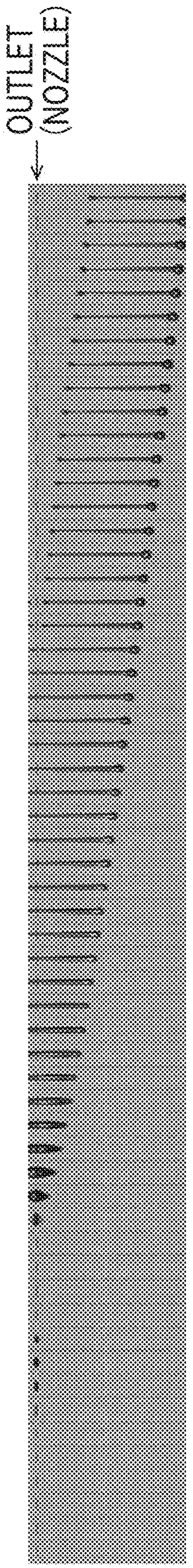
FIG. 3 is an example of an image in which a flight shape is imaged.

FIG. 3 is an image example of the flight shape of the ink ejected from the ink jet head. FIG. 3 illustrates the flight shape at each time point perceived from a time series image group obtained by continuously imaging the ink ejected from the ink jet head by applying the drive waveform at a certain time interval. FIG. 3 illustrates an example of images captured at an interval of 1 microsecond (μs). An example of the certain time interval is 1 μs.

It is desirable to set, as an imaging region, a region sufficient for acquiring the flight characteristic of the ink from a nozzle that is an ink outlet. In order to perceive a mode of flight in a time series direction (time axis direction), imaging is performed at the certain time interval, and imaging is performed with the number of steps (the number of imaging operations) in which an ink droplet is almost partially cut off outside a screen. Thus, images corresponding to the number of time series are obtained with respect to one drive waveform. FIG. 3 is an example in which regions of interest are cropped from the images corresponding to the number of time series and are arranged in time series.

It is preferable that color contrast between color of an ink region and a background region is as clear as possible considering subsequent image processing. In addition, it is preferable that resolution of a region that is a boundary between the ink droplet and the background region is sharp.

As illustrated in FIG. 3, ejection of the ink starts from the nozzle of the ink jet head to form a liquid column, and the ink is separated from the nozzle to fly while deforming into a droplet shape.

Step S2: Extraction of Characteristic from Flight Shape Image

In step S2 in FIG. 1, the first processor extracts the characteristic from the acquired flight shape image through image processing. While the "characteristic" here is, for example, a droplet amount, a droplet speed, and whether or not a satellite droplet is present, other characteristics may be present. The characteristic such as the droplet amount, the droplet speed, and whether or not the satellite droplet is present is an example of an evaluation value (evaluation indicator) calculated based on the flight shape.

The droplet speed is a speed of the ink droplet and is calculated by extracting an ink region through image processing and determining how much the ink region has transitioned per unit time. The droplet amount is an amount of the ink droplet and is calculated from an area of the ink region extracted through image processing by converting the area to be equivalent to a volume. At this point, only the ink that is actually separated from the nozzle to fly is added as the droplet amount, and the ink that is not separated from the nozzle and that returns to the nozzle is not added as the droplet amount. While the ink droplet normally deforms into one sphere and flies after being ejected (satellite droplet is absent), a state where the ink droplet flies as two or more spheres divided in the middle of deformation (satellite droplet is present) is probable. Whether or not the satellite droplet is present refers to a difference between the states (refer to F4B in the right drawing of FIG. 4).

Figure 4:
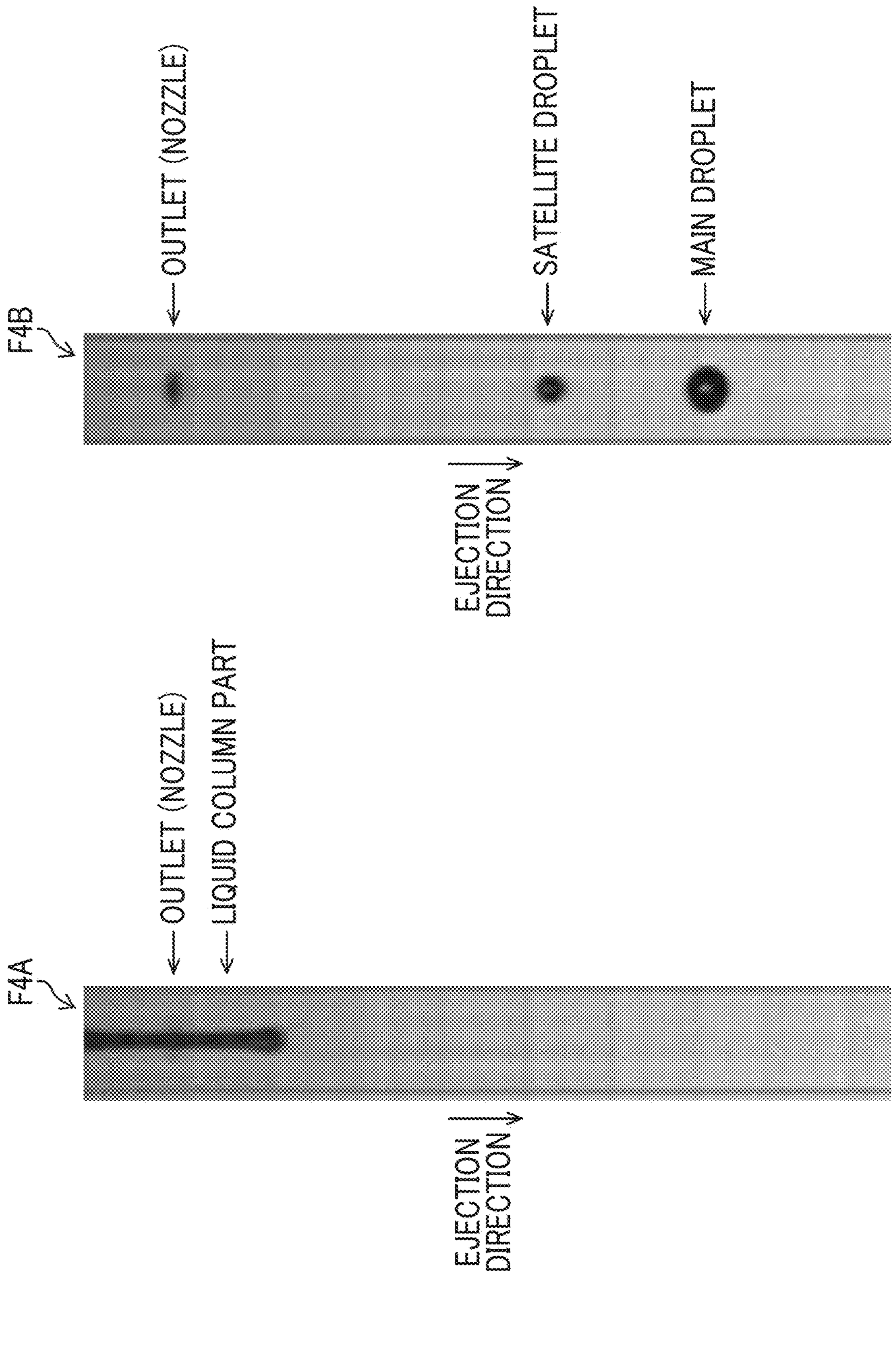
FIG. 4 is an image diagram of a liquid droplet ejected from an ink jet head.

FIG. 4 illustrates an image of the liquid droplet after ejection. F4A that is the left drawing of FIG. 4 represents a state where a liquid column part extends from an outlet immediately after ejection is started. F4B that is the right drawing illustrates a subsequent state where a main droplet and a satellite droplet fly as separated spheres (satellite droplet is present).

Determination as to whether or not the satellite droplet is present is also based on whether or not the region is divided into a plurality of parts in a case where the ink droplet is extracted from the flight shape image through image processing. In addition, whether or not the satellite droplet is present takes into consideration only the ink that is actually separated from the nozzle to fly is added as the droplet amount, and the ink that is not separated from the nozzle and that returns to the nozzle is not taken into consideration. In addition, while whether or not the satellite droplet is present is a binary determination result, a distance of a final droplet in a case where a first droplet (main droplet) has reached a certain distance (in a case where the satellite droplet is not present, the distance is set to 0) may be used. In this case, a numerical value indicating the distance is used.

Step S3: Creation of Autoencoder

In step S3 in FIG. 1, the first processor generates the drive waveform of various available forms, compresses the drive waveform into the latent space using an autoencoder, and optimizes parameters of the autoencoder to reconfigure the input drive waveform from the compressed information. The term "optimization" means approximation to an optimal state and is not limited to actual reaching to the optimal state.

Step S3 is a step of processing of creating the autoencoder that compresses high-dimensional data of the drive waveform into the lower-dimensional latent space as a pre-stage for creating the prediction model. Step S3 may be executed as processing independent of step S1 and of step S2 or may be executed before step S1 and step S2.

Processing content of step S3 will be described using an example of representing the drive waveform with 12 parameters as in FIG. 2. The first processor generates various drive waveforms by randomly generating the parameters. Since E1, E2, and E3 of the parameters illustrated in FIG. 2 denote potentials, the first processor extracts each random real number from a range of potentials that can be input into the ink jet head. The random real number may be assumed to have a uniform distribution or may be assumed to have a normal distribution or other probability distributions. An interval is set to be approximately potential resolution of the input. Similarly, appropriate ranges are set for t1 to t9, and a numerical value equivalent to a time is randomly extracted. An interval for this is also set to be approximately temporal resolution of the input. In addition, input that is apparently improper may be excluded in advance.

The drive waveform generated using the random real number can be generated as many as possible as long as time and a memory capacity permit. While a learning effect is increased as the number of drive waveforms is increased, the number of drive waveforms is set to, for example, approximately 100000 to 1000000. The drive waveform has one-dimensional potentials corresponding to the number of steps of the temporal resolution and is significantly high dimensional. For example, in a case where a length of the drive waveform is 30 us and where the temporal resolution is 0.01 μs, the number of steps representing the potentials of the drive waveform is 3000, and the drive waveform is a vector in 3000 dimensions.

Mapping such a high-dimensional vector to the latent space that is a relatively low-dimensional space is considered. As a method of mapping to the latent space, a technique referred to as the autoencoder has been suggested in recent years. The autoencoder is a machine learning technique widely used in the artificial intelligence field and the like.

In step S3 in FIG. 1, the first processor randomly generates various types of drive waveforms, performs unsupervised learning using the multiple drive waveforms, and optimizes the parameters of the autoencoder to reconfigure and output the same waveform as the input drive waveform.

As long as a format (temporal resolution or the like) of vectorization representing the drive waveform does not change in the autoencoder, the optimized (trained) autoencoder can then be reused once the parameters are optimized.

Accordingly, in a case where the trained autoencoder can be used, step S3 can be omitted.

Example of Autoencoder

Figure 5:
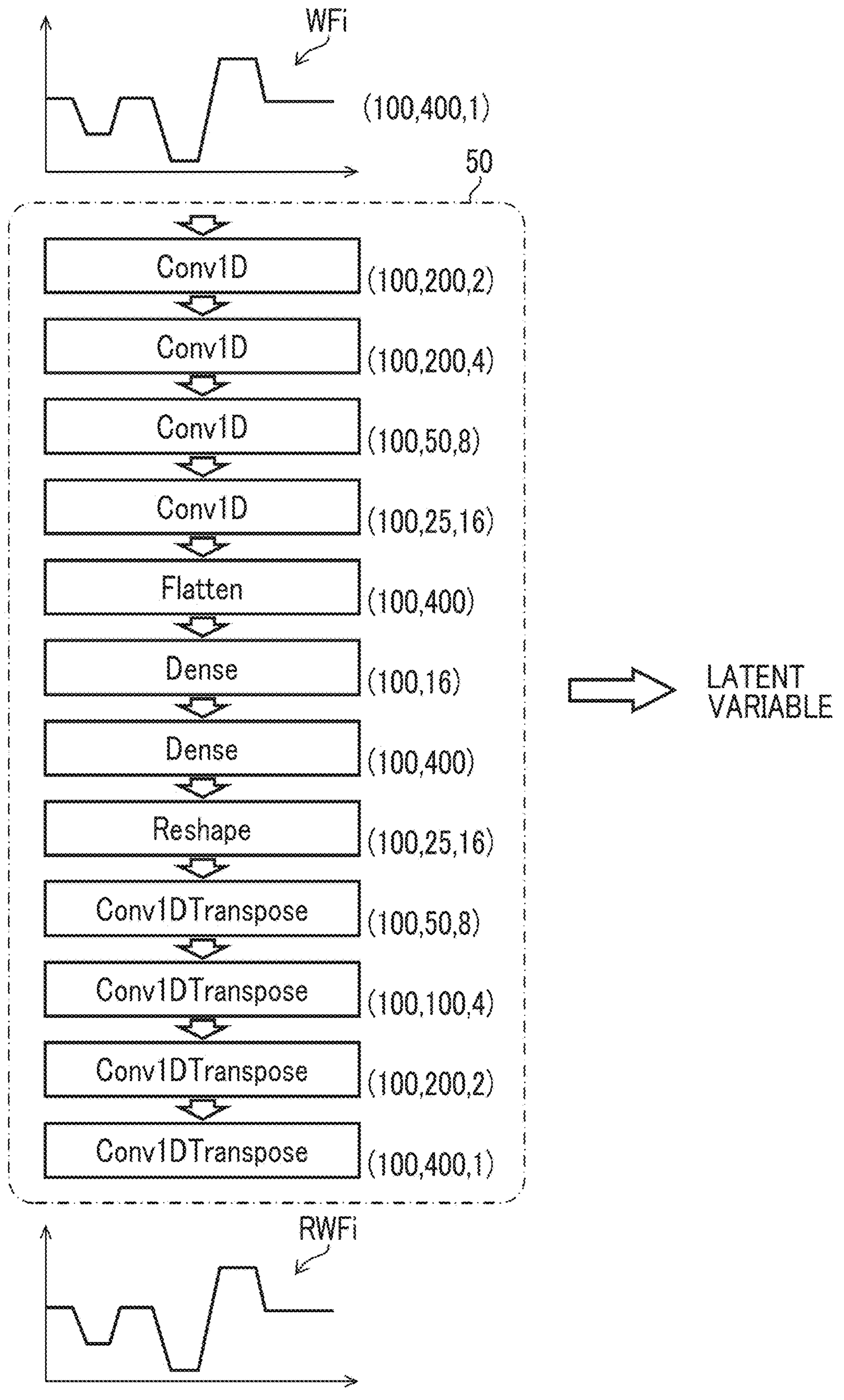
FIG. 5 is a descriptive diagram illustrating a configuration example of an autoencoder.

FIG. 5 illustrates an example of an autoencoder 50. The autoencoder 50 outputs a reconfigured vector RWFi in the same dimension as the input by performing downsampling a plurality of times using a convolutional layer or the like to output an input high-dimensional vector WFi as a low-dimensional latent space and then performing upsampling using a fully connected layer and a convolutional layer. At this point, the low-dimensional latent space is established by learning to have the same vector as the input and the output. A number in parentheses ( ) illustrated in FIG. 5 represents a dimensional number of an input tensor in the layer. For example, (100, 400, 1) of the input drive waveform represents a tensor of 100×400×1. Each dimension of the input drive waveform corresponds to the following.

TABLE 1

| Dimension | Meaning | Example |
|---|---|---|
| Dimension 1 | Number of Levels of Drive Waveforms | 100 |
| Dimension 2 | Number of Steps in Time Series Direction | 400 |
| Dimension 3 | Signal Dimension (Number of Filters) | 1 |

In the low-dimensional latent space, vectors corresponding to similar waveforms as the drive waveform are disposed close to each other (a distance defined as a Euclidean distance is short). It can be considered that the similar waveforms as the drive waveform also have similar characteristics.

While the autoencoder 50 can be changed to have various middle layers depending on a purpose or application, the autoencoder 50 may be implemented using a technique such as recurrent neural networks (RNN) or a long short-term memory (LSTM) that can handle time series data, since the input vector is a time series signal.

Using this method, for example, the input drive waveform in approximately 3000 dimensions can be compressed into the latent space in approximately 10 to 20 dimensions. For example, the autoencoder 50 can compress a vector in 3000 dimensions into a vector on the latent space in 16 dimensions.

Step S4: Obtaining Latent Variable from Drive Waveform Used in Ejection Experiment In step S4 in FIG. 1, the first processor obtains the vector on the latent space corresponding to each drive waveform by inputting each of the plurality of drive waveforms used in the ejection experiment conducted in step S1 into the trained autoencoder. The vector on the latent space may be understood as coordinates indicating a position on the latent space. Data of the multi-dimensional drive waveform is converted into the vector in the lower-dimensional latent space by the autoencoder. Step S4 is an example of a step of compressing the drive waveform into the latent space in dimensions less than the dimensions of the drive waveform.

For example, 100 types of the drive waveforms obtained in step S1 are mapped to the latent space in 16 dimensions by inputting each drive waveform into the trained autoencoder obtained in step S3. It is found that similar drive waveforms are disposed at positions at a short distance in the latent space.

Step S5: Creation of Prediction Model

In step S5, the first processor creates the prediction model to learn a correspondence relationship between the vector on the latent space and the characteristic and to output a predicted value of the characteristic for any drive waveform by performing machine learning using data in which the vector on the latent space obtained in step S4 and the characteristic obtained in step S2 are linked with each other.

The characteristic obtained in step S2 corresponds to each of the 100 types of drive waveforms obtained in step S1. That is, a space in which a quantity (y value) of each characteristic such as the droplet amount, the droplet speed, and whether or not the satellite droplet is present is associated with the vector (x coordinate) in the latent space in 16 dimensions can be created (refer to FIG. 6).

Figure 6:
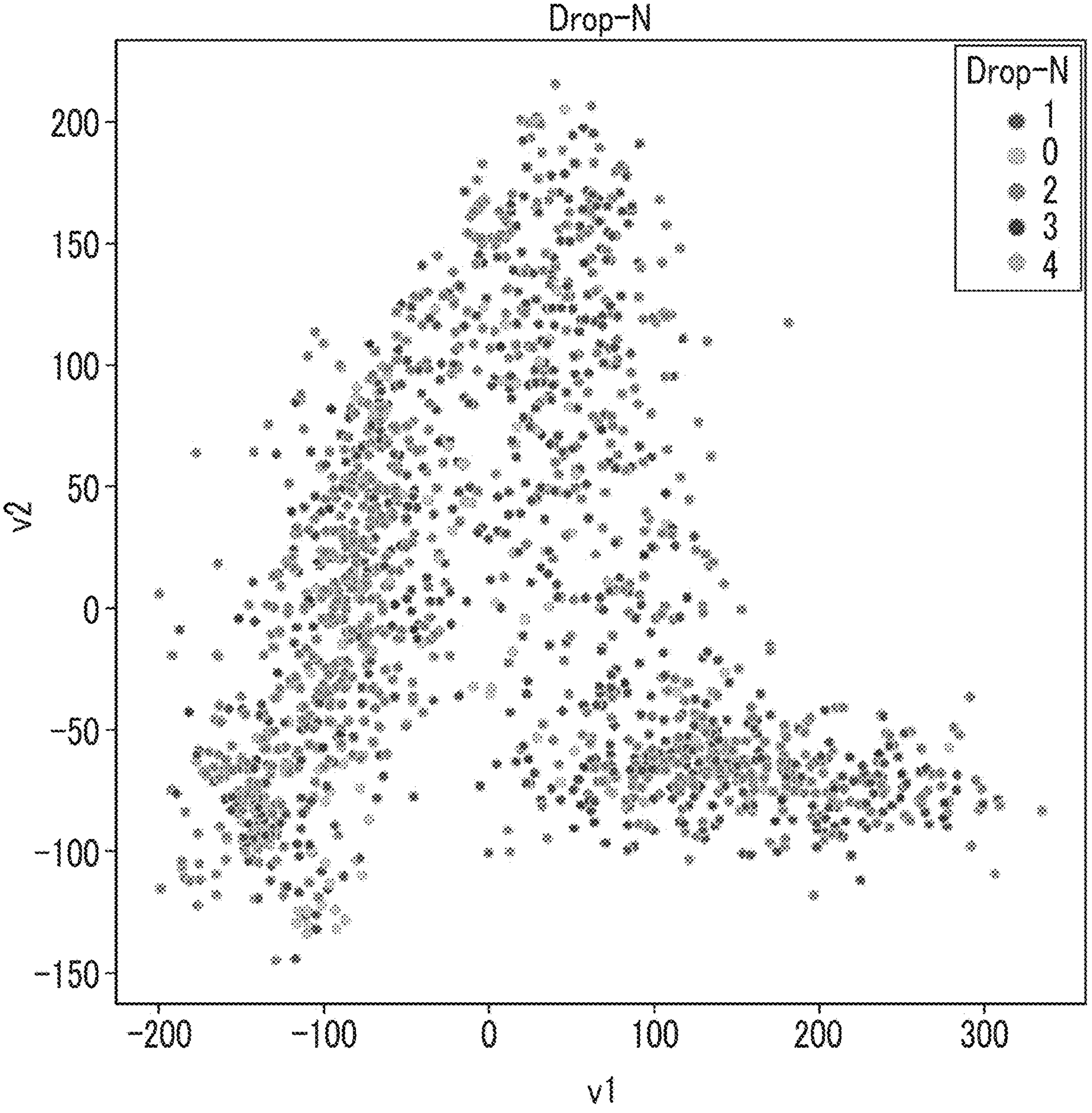
FIG. 6 is a diagram illustrating an example of mapping a characteristic value on a latent space.

FIG. 6 is an example of mapping a characteristic value on the latent space. In FIG. 6, for convenience of illustration, the latent space is in two dimensions, and the number of drops is illustrated as an example of the characteristic value. The number of drops may be an indicator indicating whether or not the satellite droplet is present.

A machine learning model that predicts the y value at an unknown x coordinate using a plurality of correspondences between the known x coordinate and the y value in a case where there are a plurality of pieces of data of the y value corresponding to the x coordinate is known. For example, Gaussian process regression outputs an average value and a standard deviation of the y value with respect to an unknown x coordinate using a plurality of combinations of the x coordinate and the y value as learning data. A general linear regression model, a generalized linear model, a support vector machine, or the like can also be used for the same application. Through step S5, parameters of the machine learning model are optimized, and the prediction model that predicts the y value at an unknown x coordinate is created.

Step S6: Prediction of Flight with Respect to New Drive Waveform Using Prediction Model In step S6 in FIG. 1, the second processor generates and inputs a new drive waveform that has not been executed in step S1 into the autoencoder to obtain a corresponding vector on the latent space and predicts the characteristic of the drive waveform using the prediction model.

That is, in step S6, a drive waveform that has not been executed in the ejection experiment in step S1 is randomly extracted and is mapped to the latent space using the autoencoder to obtain a predicted characteristic from the prediction model. A method of random extraction in the case of generating the new drive waveform may be the same as the method of random extraction described in step S3.

Step S7: Evaluation of Predicted Characteristic

In step S7 in FIG. 1, in a case where the predicted characteristic is acquired in step S6, the second processor determines whether or not the predicted characteristic satisfies a desired characteristic. For example, in a case where a condition designated as a target value of the desired characteristic includes conditions of "droplet speed of 7 m/s or higher, droplet amount of 3 picoliters (pL) or higher, and satellite droplet is not present", whether or not the predicted characteristic satisfies all of the conditions of the target value is determined.

In a case where a determination result of step S7 is a No determination, the second processor returns to step S6 and predicts the characteristic of another drive waveform. That is, in a case where the predicted characteristic does not satisfy any of the conditions (desired conditions) of the target characteristic designated in advance, a return is made to step S6 to further generate a new drive waveform, and comparison between the predicted characteristic and the desired characteristic (step S7) is repeated until a successful determination is made.

Meanwhile, in a case where the determination result of step S7 is a Yes determination, the second processor transitions to step S8. That is, in a case where the predicted characteristic satisfies all of the desired conditions, extraction succeeds, and a transition is made to step S8.

Step S8: Determination of Drive Waveform

In step S8 in FIG. 1, the second processor determines the drive waveform having the predicted characteristic satisfying the desired conditions as the drive waveform suitable for ejecting the ink to be used. After step S8, the flowchart in FIG. 1 is finished.

In the case of creating a plurality of drive waveforms that satisfy the desired conditions, step S6 to step S8 may be repeated until the number of successes reaches a desired number.

In addition, the predicted characteristic may be scored to extract a predicted characteristic having a higher score with priority. For example, in the case of constructing the prediction model using Gaussian process regression in step S5, since the average value and the standard deviation of the predicted characteristic are obtained as output of the prediction model, a magnitude of prediction accuracy can be calculated by, for example, using an upper probability of a normal distribution of the predicted characteristic. For example, a probability of having a droplet speed of 7 m/s or higher can be obtained. Similarly, the magnitude of the prediction accuracy of the predicted characteristic can be evaluated by obtaining a probability that satisfies each condition of the droplet amount and whether or not the satellite droplet is present and by obtaining a joint probability of the probabilities. The magnitude of the prediction accuracy obtained in such a manner can be used as an indicator by assigning a higher priority to higher prediction accuracy. That is, the drive waveform of which the probability of the predicted characteristic exceeding the target value is high can be determined as a proper drive waveform. Similarly, the predicted characteristic may be scored based on how much the predicted characteristic exceeds the condition.

Idea in Case of Searching for Drive Waveform

In random extraction of the new drive waveform in step S6, while a method of extraction from a general probability distribution such as a uniform distribution or a normal distribution may be used as in step S3, various combinatorial optimization techniques (gradient descent method), the genetic algorithm, the Markov chain Monte Carlo method, the bandit algorithm, or the like can be used by using the above evaluation indicator or the like.

In addition, in the case of performing random extraction, while adjustment of search resolution is required from a viewpoint of search efficiency (time-effectiveness), variogram analysis can be used as an indicator of how much a search interval is to be set. Variogram analysis is a method of analyzing a correlation between a distance between the x coordinates of any sample points and a difference in the y value. Generally, the difference in the y value is decreased as the distance between the x coordinates is decreased. Thus, a variance of the y value is small with respect to a combination of vectors having equal distances. In a case where the distance between the x coordinates is increased, the variance of the y value is increased, and the distance and the variance of the y value become uncorrelated with each other (refer to FIG. 7 to FIG. 9). Even in a case where distances shorter than the uncorrelated distance are extracted, an amount of obtained information is considered to be small. Thus, by setting the search interval to be greater than or equal to the distance, the search efficiency can be further improved.

Figure 7:
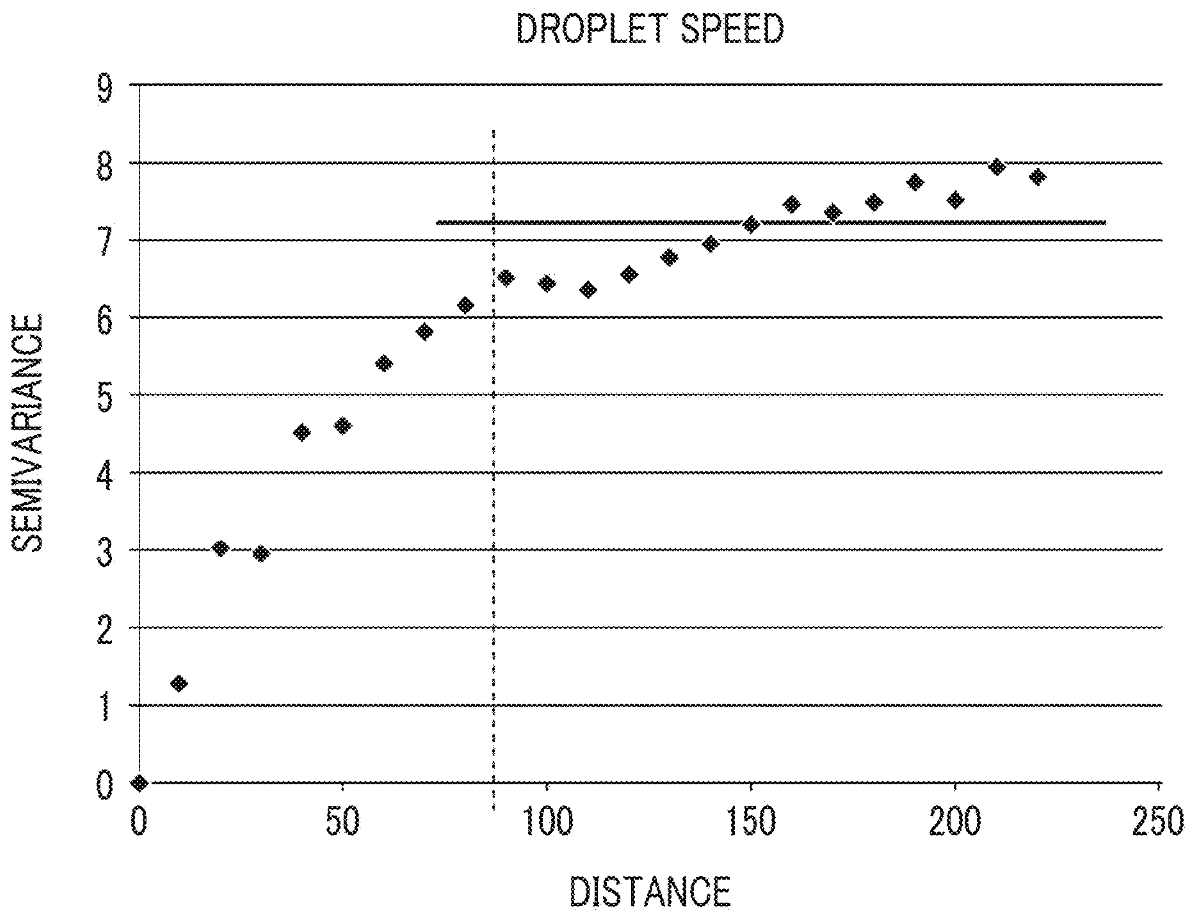
FIG. 7 is a graph illustrating an example of variogram analysis related to a droplet speed.
Figure 8:
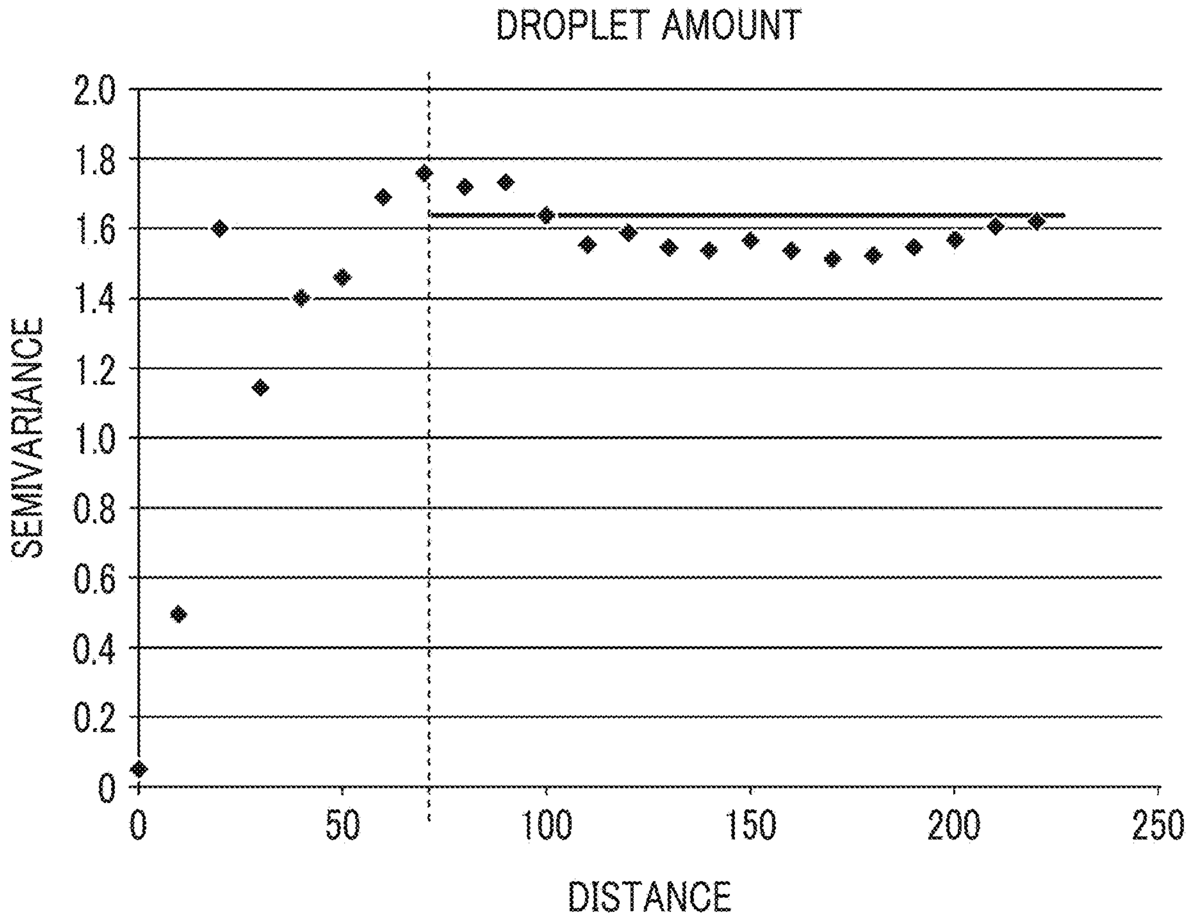
FIG. 8 is a graph illustrating an example of variogram analysis related to a droplet amount.
Figure 9:
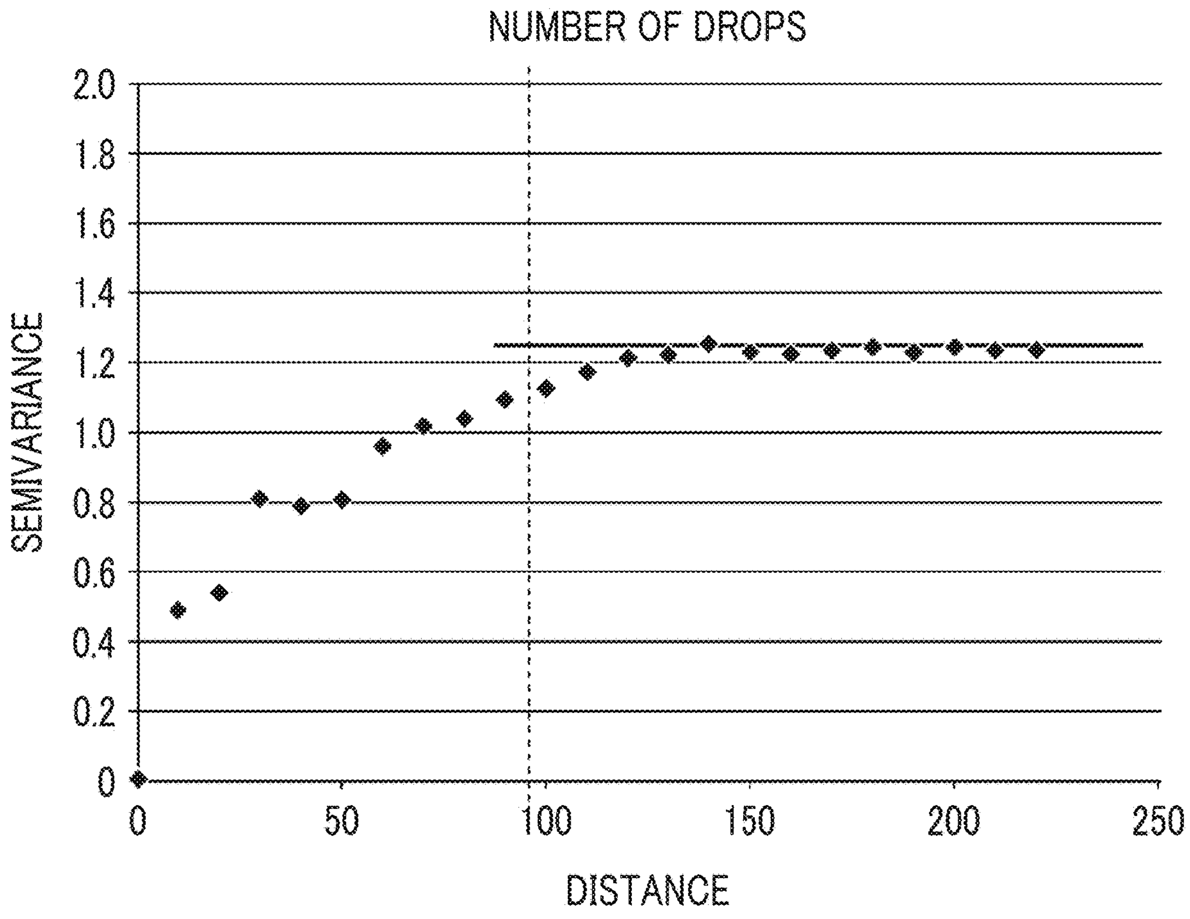
FIG. 9 is a graph illustrating an example of variogram analysis related to the number of drops.

FIG. 7 to FIG. 9 are graphs illustrating examples of variogram analysis. FIG. 7 is an analysis result with respect to the droplet speed, FIG. 8 is an analysis result with respect to the droplet amount, and FIG. 9 is an analysis result with respect to the number of drops. In these drawings, a distance illustrated by a broken line represents a distance (range) in which the distance and the variance of the y value become uncorrelated with each other. In such a manner, it is preferable to perform variogram analysis in advance and to set the search interval based on the result of variogram analysis.

Example of Hardware Configuration of Information Processing Apparatus

The processing of step S1 to step S8 can be executed by a computer system including one or a plurality of computers.

Figure 10:
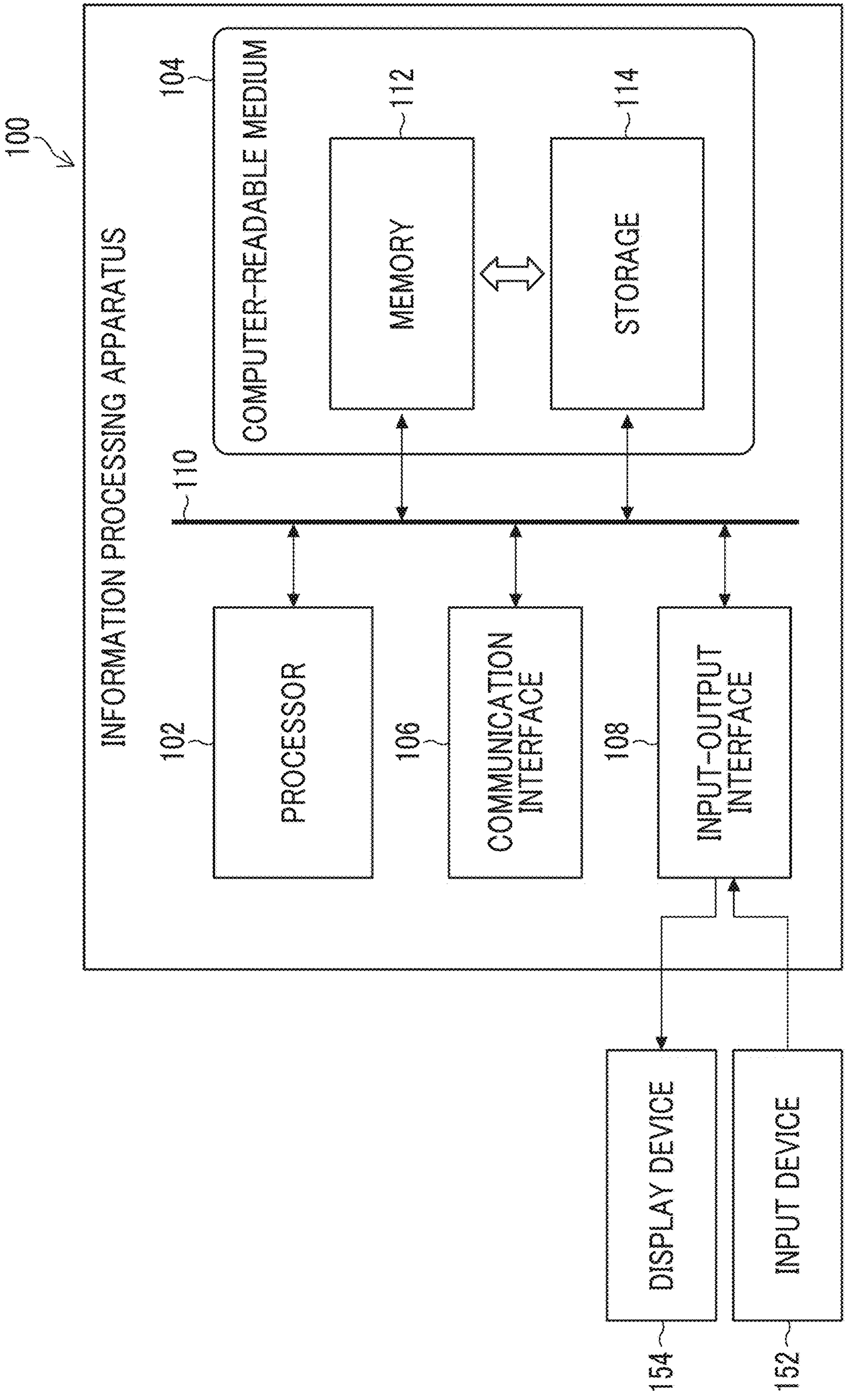
FIG. 10 is a block diagram illustrating an example of a hardware configuration of an information processing apparatus.

FIG. 10 is a block diagram illustrating an example of a hardware configuration of an information processing apparatus 100 that executes at least a part of the processing of the drive waveform creation method according to the embodiment.

The information processing apparatus 100 comprises a processor 102, a computer-readable medium 104 that is non-transitory and tangible, a communication interface 106, an input-output interface 108, and a bus 110. The processor 102 is connected to the computer-readable medium 104, the communication interface 106, and the input-output interface 108 through the bus 110. A form of the information processing apparatus 100 is not particularly limited and may be a server, a personal computer, a workstation, a tablet terminal, or the like.

The processor 102 may be at least one of the first processor or the second processor. The processor 102 includes a central processing unit (CPU). The processor 102 may include a graphics processing unit (GPU). The computer-readable medium 104 includes a memory 112 that is a main storage device, and a storage 114 that is an auxiliary storage device. For example, the computer-readable medium 104 may be a semiconductor memory, a hard disk drive (HDD) device, a solid state drive (SSD) device, or a combination of a plurality thereof. The computer-readable medium 104 is an example of a "storage device" according to the embodiment of the present disclosure.

The computer-readable medium 104 stores a plurality of programs, data, and the like for performing various types of processing. The term "program" includes a concept of a program module. The processor 102 functions as various processing units by executing instructions of the programs stored in the computer-readable medium 104.

The information processing apparatus 100 may be connected to an electric communication line, not illustrated, through the communication interface 106. The electric communication line may be a wide area communication line, an on-premise communication line, or a combination thereof.

The information processing apparatus 100 may comprise an input device 152 and a display device 154. The input device 152 is composed of, for example, a keyboard, a mouse, a multi-touch panel, other pointing devices, a voice input device, or an appropriate combination thereof. The display device 154 is composed of, for example, a liquid crystal display, an organic electro-luminescence (organic EL (OEL)) display, a projector, or an appropriate combination thereof. The input device 152 and the display device 154 are connected to the processor 102 through the input-output interface 108.

Method of Collecting Data to Be Used in Learning

Figure 11:
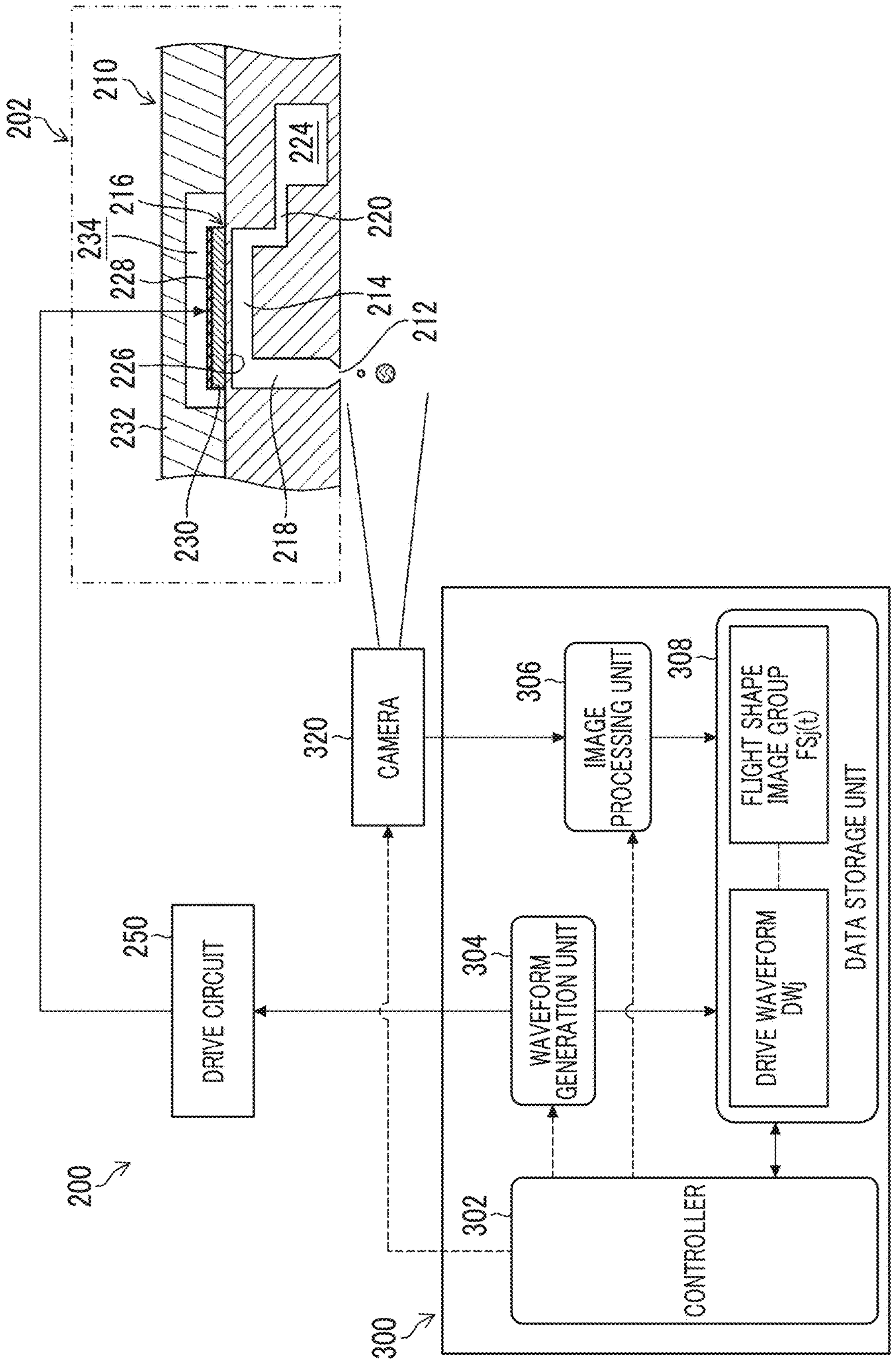
FIG. 11 is a descriptive diagram schematically illustrating a configuration example of an ink jet apparatus used in an ejection experiment for obtaining data to be used in learning.

FIG. 11 is a descriptive diagram schematically illustrating a configuration example of an ink jet apparatus 200 used in the ejection experiment for obtaining data to be used in learning.

The ink jet apparatus 200 comprises an ink jet head 202, a drive circuit 250, an information processing apparatus 300, and a camera 320.

While a three-dimensional structure of one ejector 210 in the ink jet head 202 is illustrated as a cross section view in FIG. 11, the ink jet head 202 comprises a plurality of ejectors 210. The ink jet head 202 is an example of a "liquid ejection head" according to the embodiment of the present disclosure. The ink jet apparatus 200 may be an apparatus for experiment or an ink jet printing apparatus used for printing.

The ejector 210 of the ink jet head 202 comprises a nozzle 212, a pressure chamber 214, and a piezoelectric element 216. The nozzle 212 communicates with the pressure chamber 214 through a nozzle flow channel 218. The pressure chamber 214 communicates with a supply-side common flow channel 224 through an individual supply path 220.

A vibration plate 226 constituting a ceiling of the pressure chamber 214 comprises a conductive layer, not illustrated, that functions as a common electrode corresponding to a lower electrode of the piezoelectric element 216. The pressure chamber 214, wall parts of other flow channel parts, and the vibration plate 226 can be made of silicon.

A material of the vibration plate 226 is not limited to silicon, and the vibration plate 226 may be formed of a non-conductive material such as resin. The vibration plate 226 itself may be formed of a metal material such as stainless steel and be used as a vibration plate that doubles as the common electrode.

A piezoelectric unimorph actuator is composed of a structure in which the vibration plate 226 is laminated with the piezoelectric element 216. The piezoelectric element 216 is connected to the drive circuit 250 and is driven by a drive voltage supplied from the drive circuit 250. A volume of the pressure chamber 214 is changed by deforming a piezoelectric body 230 to bend the vibration plate 226 via application of the drive voltage to an individual electrode 228 that is an upper electrode of the piezoelectric element 216. A change in pressure caused by the change in the volume of the pressure chamber 214 acts on the ink to eject the ink from the nozzle 212.

In a case where the piezoelectric element 216 is restored to an original state after ejection of the ink, the pressure chamber 214 is filled with new ink from the supply-side common flow channel 224 through the individual supply path 220. The ink jet head 202 may comprise an ink collection path, not illustrated, for collecting the ink not used in ejection.

A plan-view shape of the pressure chamber 214 is not particularly limited and may be a quadrangular shape, other polygonal shapes, a circular shape, an elliptical shape, or the like. A cover plate 232 is provided above the individual electrode 228. The cover plate 232 is a member that secures a movable space 234 of the piezoelectric element 216 and that seals a space around the piezoelectric element 216.

A supply-side ink chamber, not illustrated, and a collection-side ink chamber, not illustrated, are formed above the cover plate 232. The supply-side ink chamber is connected to the supply-side common flow channel 224 through a communication path, not illustrated. The collection-side ink chamber is connected to a collection-side common flow channel, not illustrated, through a communication path, not illustrated.

The information processing apparatus 300 that controls the ejection operation of the ink jet head 202 includes a controller 302, a waveform generation unit 304, an image processing unit 306, and a data storage unit 308. The information processing apparatus 300 may include the drive circuit 250. A hardware configuration of the information processing apparatus 300 may be the same as that in FIG. 7. A processing function of each unit of the information processing apparatus 300 may be implemented by executing the instructions of the programs via the processor 102.

The information processing apparatus 300 is connected to the camera 320. The camera 320 is disposed at a position at which a flight state of the ink ejected from the nozzle 212 can be imaged. The controller 302 controls the entire system including the ink jet head 202 and the camera 320. The waveform generation unit 304 may generate drive waveforms DWj of various waveforms in accordance with an instruction from the controller 302. For example, the waveform generation unit 304 may generate a plurality of drive waveforms DWj obtained by varying the combination of the values of the 12 parameters described in FIG. 2. Subscript j denotes an index for identifying the plurality of drive waveforms. For example, in the case of generating 100 types of the drive waveforms DWj, j takes an integer of 1 to 100.

The drive circuit 250 supplies the drive voltage of the drive waveform DWj generated by the waveform generation unit 304 to the piezoelectric element 216. By driving the piezoelectric element 216 in such a manner, the ink is ejected from the nozzle 212. The camera 320 images the flight state of the ink ejected from the nozzle 212 at the certain time interval. The controller 302 controls an imaging timing of the camera 320 in synchronization with driving of the piezoelectric element 216. An image group in time series captured by the camera 320 is transmitted to the image processing unit 306.

The image processing unit 306 generates a flight shape image group FSj(t) in time series showing the flight shape of the ink by performing required processing such as extraction of the region of interest and crop processing with respect to the acquired images. Subscript t denotes a time point in time series.

The controller 302 stores the drive waveform DWj and the flight shape image group FSj(t) in the data storage unit 308 by associating (linking) the drive waveform DWj with the flight shape image group FSj(t). In such a manner, a data set including the plurality of drive waveforms DWj and a plurality of the flight shape image groups FSj(t) corresponding to the plurality of drive waveforms DWj, respectively, is created. A part or the entirety of the data set is used as the data set for learning. Such a data set is created for each combination of the ink to be used and the ink jet head 202.

Method of Creating Autoencoder

Figure 12:
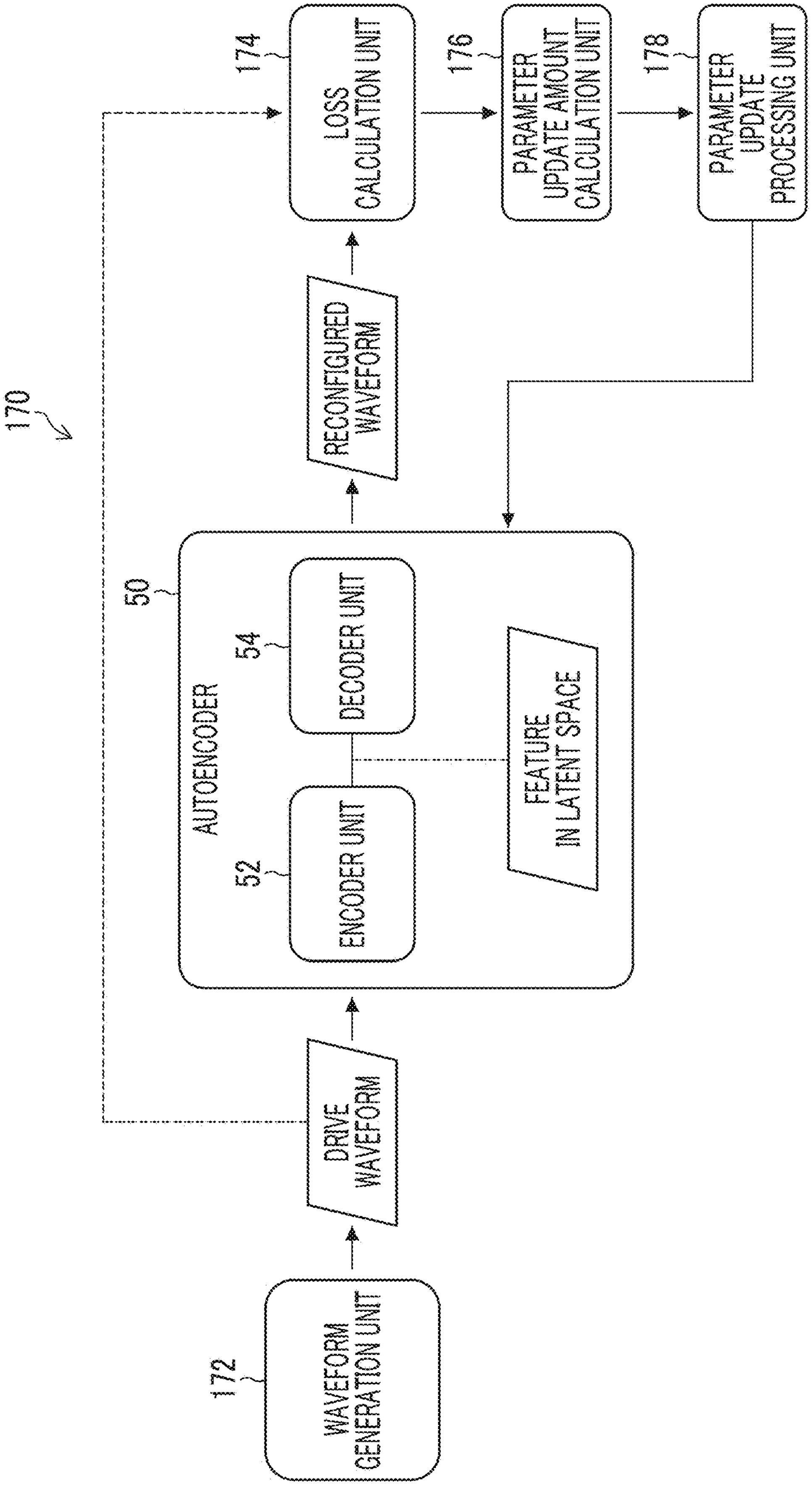
FIG. 12 is a block diagram schematically illustrating a functional configuration of an information processing apparatus that executes processing of creating the autoencoder.

FIG. 12 is a block diagram schematically illustrating a functional configuration of an information processing apparatus 170 that executes processing of creating the autoencoder. A hardware configuration of the information processing apparatus 170 may be the same as the configuration described in FIG. 10. A processing function of each unit of the information processing apparatus 170 is implemented by executing the instructions of the programs via the processor 102.

The information processing apparatus 170 comprises a waveform generation unit 172, the autoencoder 50, a loss calculation unit 174, a parameter update amount calculation unit 176, and a parameter update processing unit 178. The waveform generation unit 172 may have the same configuration as the waveform generation unit 304 in FIG. 11.

The autoencoder 50 includes an encoder unit 52 and a decoder unit 54. A drive waveform generated by the waveform generation unit 172 is input into the autoencoder 50, and a feature of the latent space is extracted by the encoder unit 52. The feature of the latent space extracted by the encoder unit 52 is reconfigured by the decoder unit 54, and a reconfigured waveform is output. The loss calculation unit 174 calculates a loss indicating an error between the reconfigured waveform output by the autoencoder 50 and the original input drive waveform. The parameter update amount calculation unit 176 calculates update amounts of the parameters of the autoencoder 50 based on the calculated loss. The parameter update processing unit 178 updates the parameters of the autoencoder 50 in accordance with the calculated update amounts.

The parameters of the autoencoder 50 are optimized by updating the parameters of the autoencoder 50 a plurality of times to obtain the same reconfigured waveform as the input drive waveform using multiple drive waveforms. The information processing apparatus 170 functions as a machine learning system that executes machine learning processing of creating the autoencoder 50. The processing function of the information processing apparatus 170 may be incorporated in the information processing apparatus 300 in FIG. 11.

Method of Creating Prediction Model: Example 1

Figure 13:
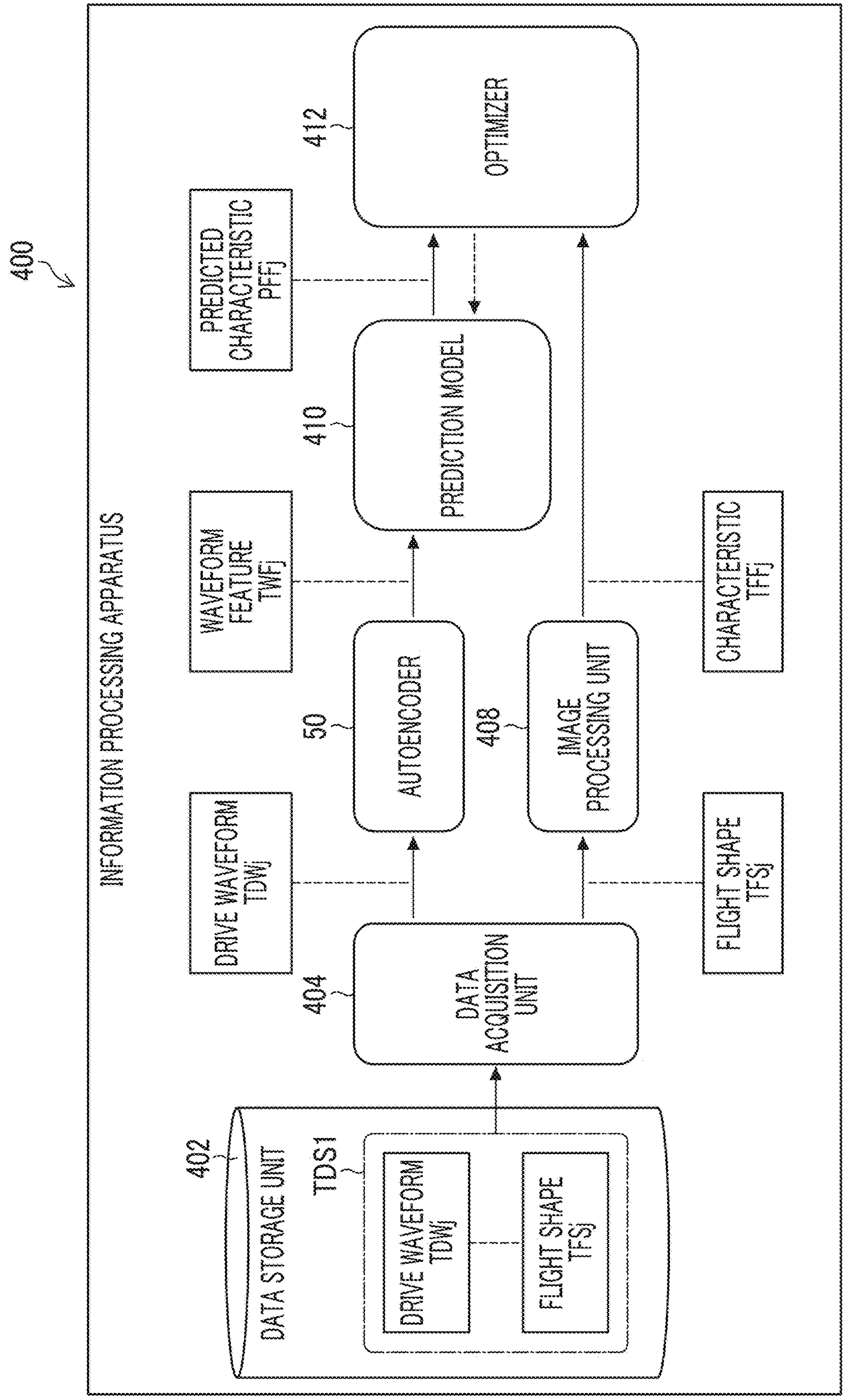
FIG. 13 is a block diagram schematically illustrating a functional configuration of an information processing apparatus that executes processing of creating a prediction model.

FIG. 13 is a block diagram schematically illustrating a functional configuration of an information processing apparatus 400 that executes processing of creating the prediction model. A hardware configuration of the information processing apparatus 400 may be the same as the configuration described in FIG. 10. The information processing apparatus 400 comprises a data storage unit 402, a data acquisition unit 404, the autoencoder 50, an image processing unit 408, a prediction model 410, and an optimizer 412.

The data storage unit 402 stores a data set TDS1 including a plurality of sets of data in which a drive waveform TDWj and a flight shape TFSj corresponding to the drive waveform TDWj are linked with each other. The drive waveform TDWj and the flight shape TFSj corresponding to the drive waveform TDWj may be the drive waveform DWj and the flight shape image group FSj(t) in time series collected using the method described in FIG. 7.

The data acquisition unit 404 acquires the sets of data including the drive waveform TDWj and the flight shape TFSj from the data storage unit 402. The drive waveform TDWj acquired through the data acquisition unit 404 is input into the autoencoder 50. The flight shape TFSj acquired through the data acquisition unit 404 is input into the image processing unit 408.

The autoencoder 50 is the trained autoencoder described in FIG. 5. Instead of the autoencoder 50, only the encoder unit 52 in the trained autoencoder 50 may be used.

The autoencoder 50 compresses the input drive waveform TDWj into the latent space and outputs a waveform feature TWFj represented by a vector in the latent space. The waveform feature TWFj is input into the prediction model 410.

The prediction model 410 is a machine learning model that receives input of the waveform feature TWFj and that outputs a predicted characteristic PFFj. For example, a Gaussian process regression model can be applied as the prediction model 410. In this case, the prediction model 410 outputs the average value and the standard deviation of the predicted characteristic.

The prediction model 410 is actually a program and causes a computer to implement a function of predicting the behavior of the ink jet head 202 together with the autoencoder 50. The predicted characteristic PFFj output by the prediction model 410 corresponds to a prediction result of prediction of the flight in a case where the drive waveform TDWj is applied. The predicted characteristic PFFj is transmitted to the optimizer 412.

The image processing unit 408 extracts a characteristic TFFj such as the droplet speed, the droplet amount, and whether or not the satellite droplet is present from the input flight shape TFSj. The characteristic TFFj extracted from the actual flight shape TFSj through image processing corresponds to a correct answer characteristic obtained in a case where the drive waveform TDWj is applied.

The optimizer 412 performs processing of calculating the loss indicating the error between the predicted characteristic PFFj and the correct answer (actual) characteristic TFFj by comparing both, processing of calculating update amounts of parameters of the prediction model 410 based on the loss, and processing of updating the parameters of the prediction model 410 in accordance with the calculated update amounts. The parameters of the prediction model 410 are referred to as model parameters.

The optimizer 412 updates the model parameters such that the predicted characteristic PFFj approximates the correct answer characteristic TFFj.

By updating the model parameters a plurality of times using the plurality of sets of data included in the data set TDS1, the model parameters of the prediction model 410 are optimized, and the prediction model 410 that can perform prediction with high accuracy is created. A corresponding prediction model 410 is created for each combination of the ink to be used and the ink jet head 202. The information processing apparatus 400 functions as a machine learning system that executes machine learning processing of creating the prediction model 410.

Method of Creating Prediction Model: Example 2

Figure 14:
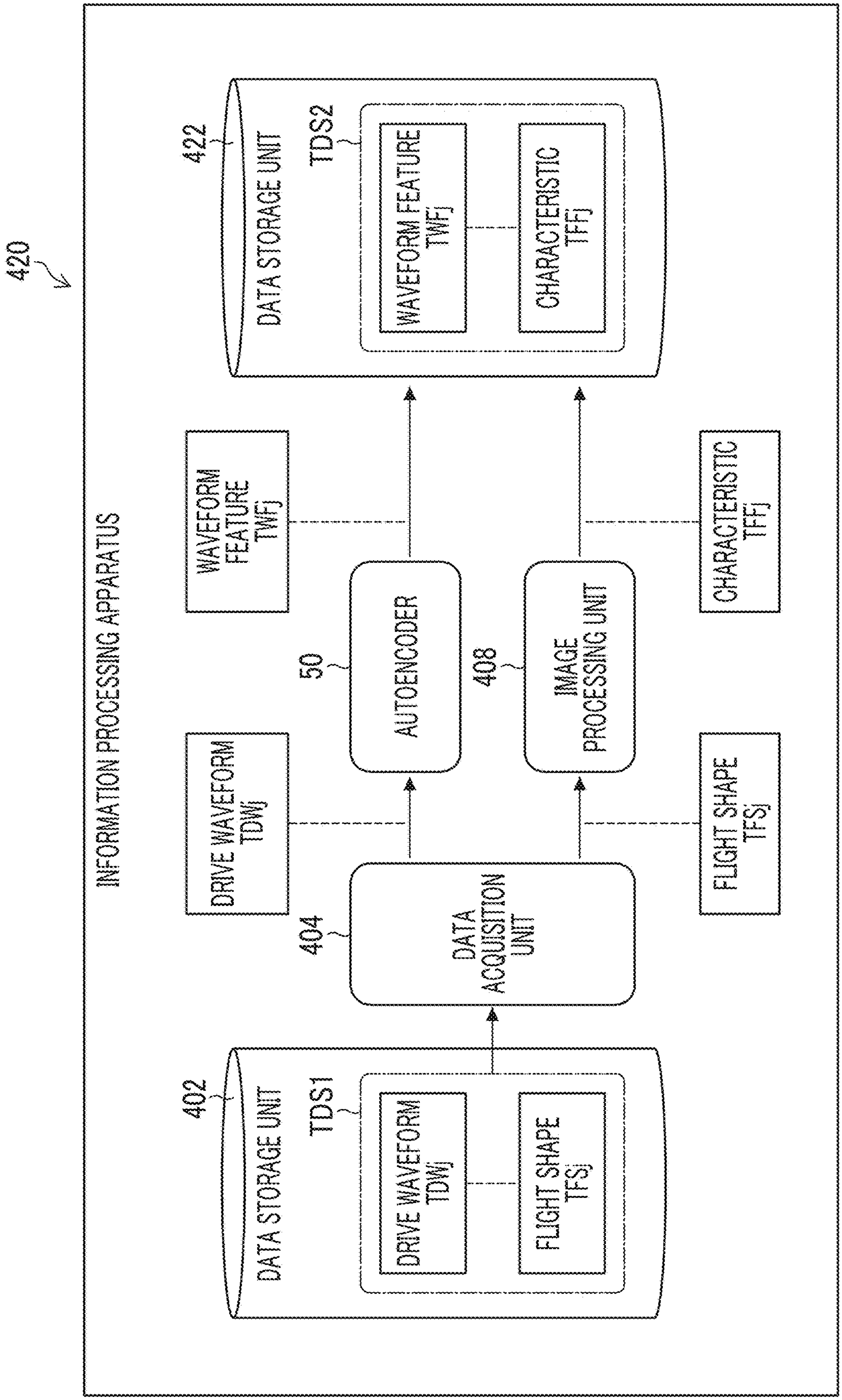
FIG. 14 is a block diagram schematically illustrating a functional configuration of an information processing apparatus that executes processing of creating a data set for learning.

While an example of using the data set TDS1 as the data set for learning has been described in the example in FIG. 13, a data set TDS2 for learning including the waveform feature TWFj and the characteristic TFFj may be constructed by creating sets of data of the waveform feature TWFj and the characteristic TFFj in advance based on the data set TDS1 as illustrated in FIG. 14.

FIG. 14 is a block diagram schematically illustrating a functional configuration of an information processing apparatus 420 that executes processing of creating the data set TDS2 for learning. A hardware configuration of the information processing apparatus 420 may be the same as the configuration described in FIG. 10. In FIG. 14, the same or similar configurations to the information processing apparatus 400 illustrated in FIG. 13 are designated by the same reference numerals and will not be described.

The information processing apparatus 420 comprises a data storage unit 422 in which the waveform feature TWFj output from the autoencoder 50 and the characteristic TFFj extracted by image processing of the image processing unit 408 that are linked with each other are stored. The data storage unit 422 stores the data set TDS2 including the plurality of sets of data of the waveform feature TWFj and the characteristic TFFj corresponding to the waveform feature TWFj.

The data storage unit 422 may be composed of a separate storage device from the data storage unit 402 or may be composed of the same storage device. The processing function of the information processing apparatus 420 may be incorporated in the information processing apparatus 300 in FIG. 11.

Figure 15:
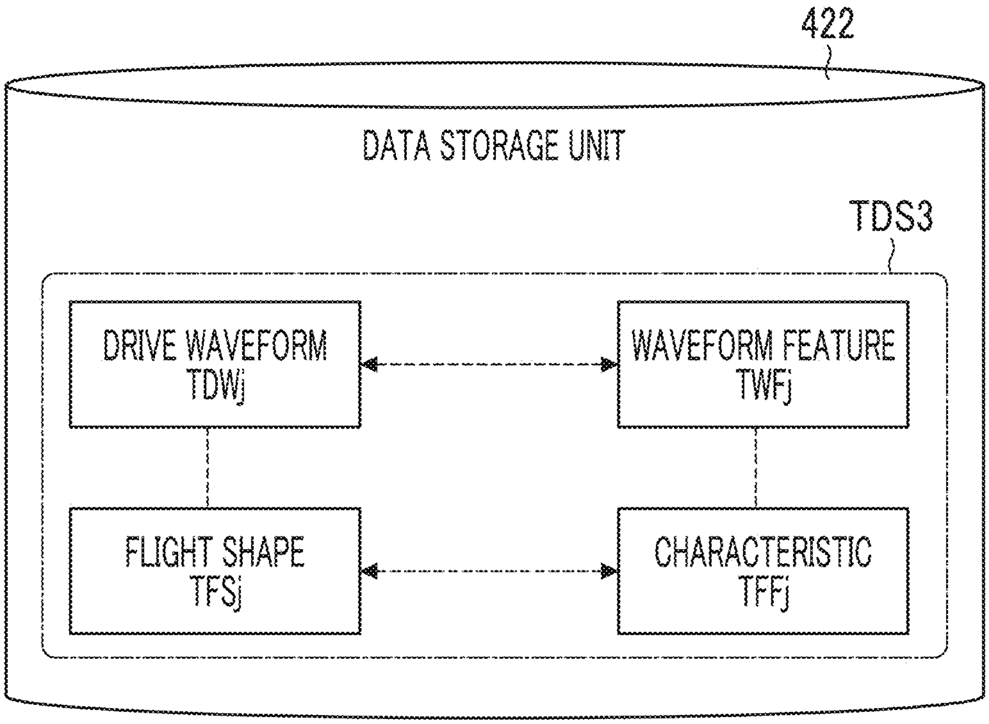
FIG. 15 is a descriptive diagram illustrating an example of the data set.

In addition, as illustrated in FIG. 15, the data set TDS1 and the data set TDS2 may be combined with each other and stored in the data storage unit 422 as a new data set TDS3.

Figure 16:
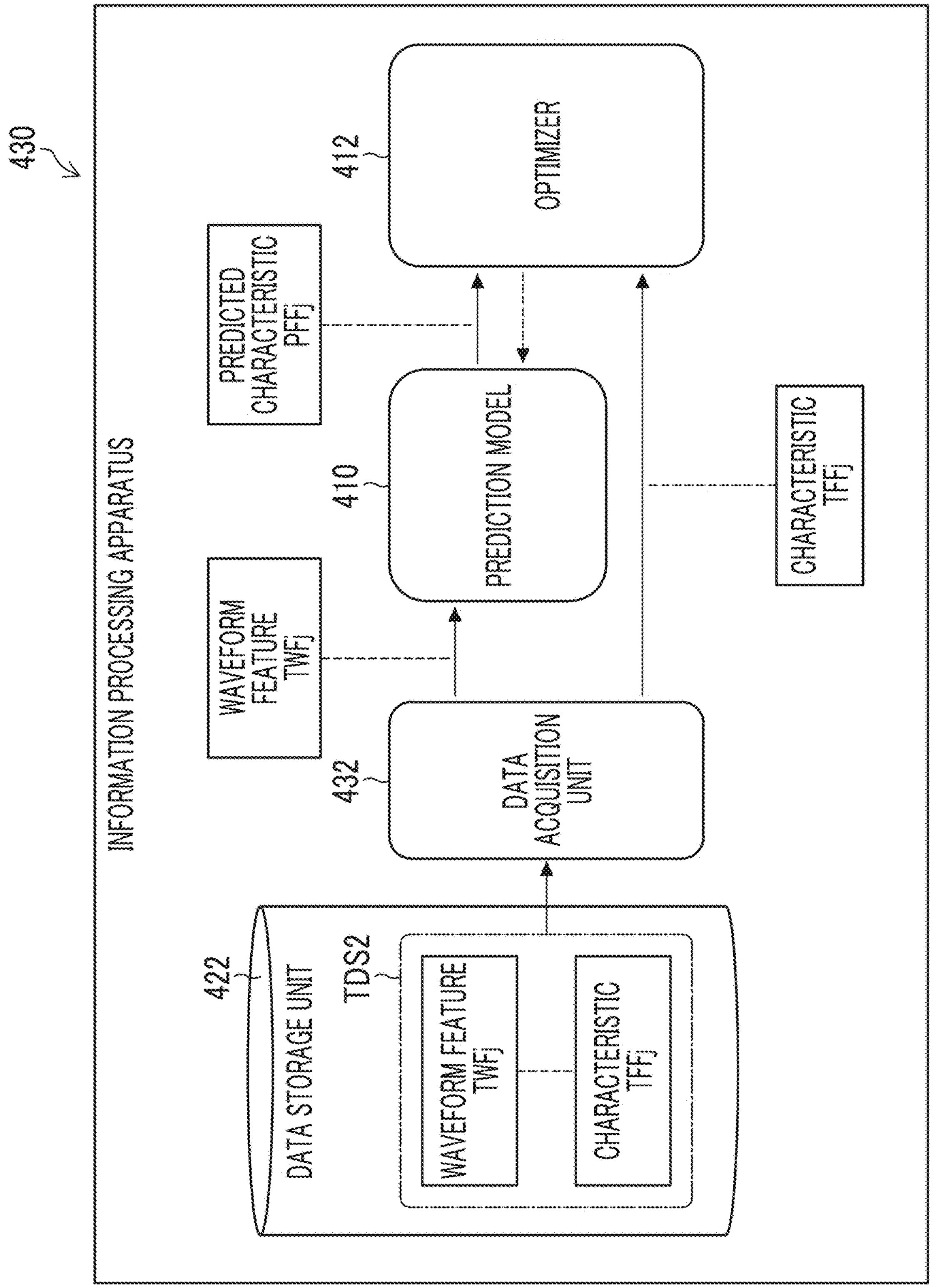
FIG. 16 is a block diagram schematically illustrating a functional configuration of an information processing apparatus that executes processing of creating the prediction model.

FIG. 16 is a block diagram schematically illustrating a functional configuration of an information processing apparatus 430 that executes processing of creating the prediction model 410 using the data set TDS2. A hardware configuration of the information processing apparatus 430 may be the same as the configuration described in FIG. 10. In FIG. 16, the same or similar configurations to the information processing apparatus 400 illustrated in FIG. 13 are designated by the same reference numerals and will not be described.

The information processing apparatus 430 includes the data storage unit 422 storing the data set TDS2, a data acquisition unit 432, the prediction model 410, and the optimizer 412. The data acquisition unit 432 acquires the sets of data including the waveform feature TWFj and the characteristic TFFj from the data storage unit 422. The waveform feature TWFj is input into the prediction model 410. The characteristic TFFj is transmitted to the optimizer 412. Other operations are the same as those in FIG. 13.

Drive Waveform Search Method Using Trained Prediction Model 410

Figure 17:
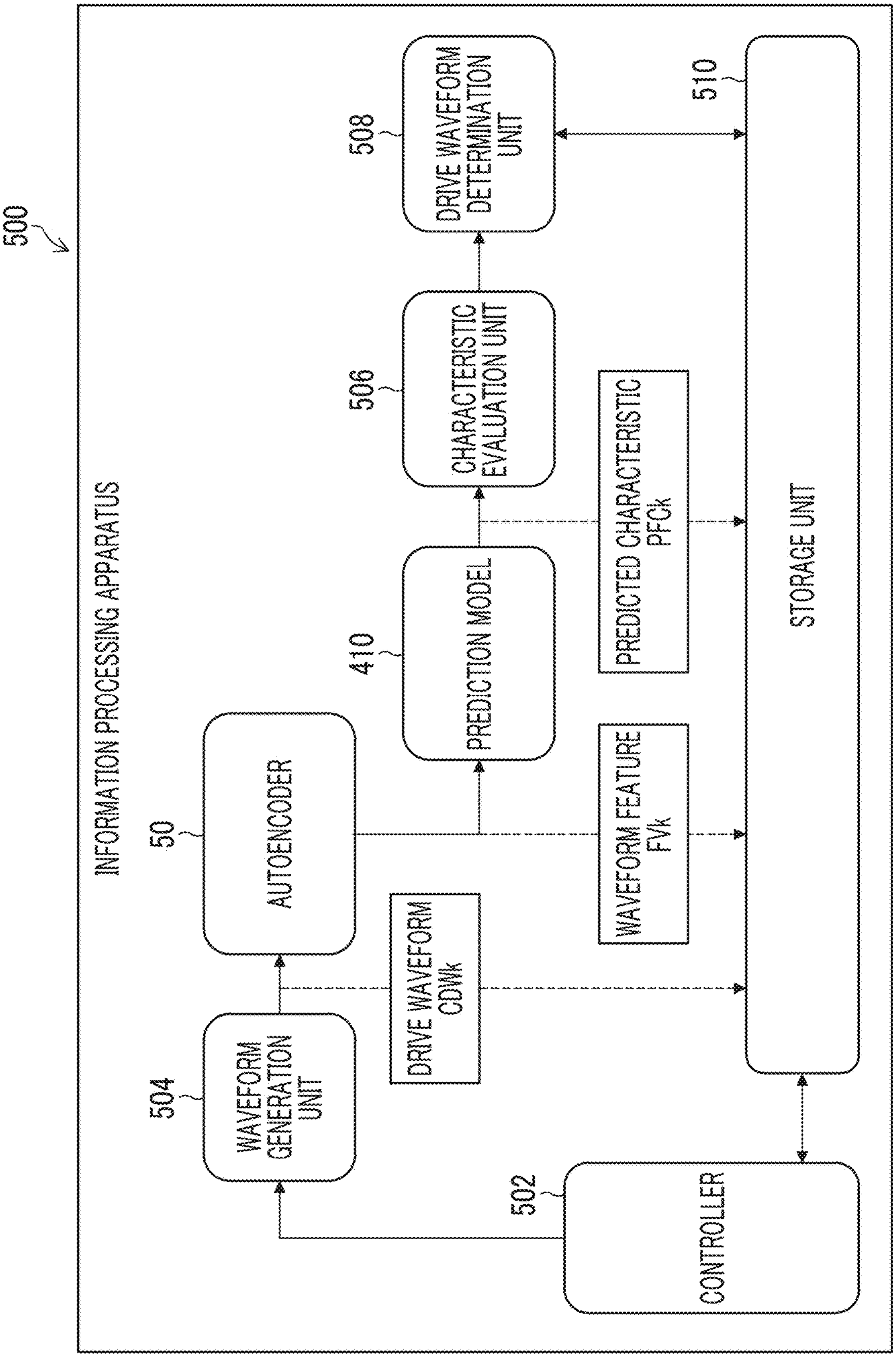
FIG. 17 is a block diagram schematically illustrating a functional configuration of an information processing apparatus that executes processing of searching for a promising drive waveform using the trained autoencoder and the trained prediction model constructed according to the present embodiment.

FIG. 17 is a block diagram schematically illustrating a functional configuration of an information processing apparatus 500 that executes processing of searching for a promising drive waveform using the trained autoencoder 50 and the trained prediction model 410 constructed according to the present embodiment. A hardware configuration of the information processing apparatus 500 may be the same as the configuration described in FIG. 10. A processing function of each unit of the information processing apparatus 500 may be implemented by executing the instructions of the programs via the processor 102.

The information processing apparatus 500 includes a controller 502, a waveform generation unit 504, the autoencoder 50, the prediction model 410, a characteristic evaluation unit 506, a drive waveform determination unit 508, and a storage unit 510. The controller 502 controls overall processing of each unit. The controller 502 instructs the waveform generation unit 504 to generate an unknown drive waveform. The unknown drive waveform is a new drive waveform other than the drive waveform used in the case of training the prediction model 410 (that is, other than the drive waveform used in the ejection experiment described in FIG. 11) and is a drive waveform having an unknown ejection characteristic.

The waveform generation unit 504 generates a plurality of drive waveforms CDWk of various waveforms in accordance with designation from the controller 502. Subscript k is an index for identifying the drive waveforms. For example, in the case of generating 400 types of drive waveforms, k may take an integer of 1 to 400. The waveform generation unit 504, for example, generates the new drive waveform CDWk by randomly changing the values of the parameters of the drive waveform.

The autoencoder 50 is the trained autoencoder described in FIG. 5. Instead of the autoencoder 50, only the encoder unit 52 in the trained autoencoder 50 may be used. The autoencoder 50 receives input of the drive waveform CDWk, compresses the drive waveform CDWk into the latent space, and outputs a waveform feature FVk.

The prediction model 410 is a trained model that is created using the information processing apparatus 400 described in FIG. 9. The prediction model 410 receives input of the waveform feature FVk and outputs a predicted characteristic PFCk. The information processing apparatus 500 performs forward prediction with respect to the ejection characteristic from the drive waveform CDWk using a combination of the autoencoder 50 and the prediction model 410.

The characteristic evaluation unit 506 evaluates whether or not the predicted characteristic PFCk output from the prediction model 410 satisfies the conditions of the target characteristic. The characteristic evaluation unit 506 determines whether or not the desired characteristic is achieved by comparing the predicted characteristic PFCk with the target value set in advance.

The controller 502 links the drive waveform CDWk, the waveform feature FVk, and the predicted characteristic PFCk with each other and stores these data in the storage unit 510. In such a manner, a collection of data including the plurality of new drive waveforms CDWk (k=1, 2 . . . ) and a plurality of the waveform features FVk and a plurality of the predicted characteristics PFCk corresponding to the plurality of new drive waveforms CDWk, respectively, is stored in the storage unit 510.

The drive waveform determination unit 508 determines the promising drive waveform based on an evaluation result of the characteristic evaluation unit 506 with respect to the predicted characteristic PFCk. The drive waveform determination unit 508 may determine the drive waveform that has the predicted characteristic PFCk satisfying the conditions of the target value set in advance and that achieves the most favorable characteristic as the optimal drive waveform.

For example, the drive waveform determination unit 508 determines the optimal drive waveform based on the evaluation value of the characteristic characterized by at least one of the droplet speed, the droplet amount, or whether or not the satellite droplet is present.

In a case where the predicted characteristic PFCk does not satisfy the conditions of the target value, the drive waveform may be excluded from candidates, and data of the drive waveform may not be stored in the storage unit 510.

In such a manner, a drive waveform suitable for ejection of the ink is created using the prediction model 410 corresponding to the combination of the ink to be used and the ink jet head 202.

Program That Operates Computer

A program that causes a computer to implement a part or all of the processing functions in each apparatus of the information processing apparatus 170, the information processing apparatus 300, the information processing apparatus 400, the information processing apparatus 420, the information processing apparatus 430, and the information processing apparatus 500 can be recorded on a computer-readable medium such as an optical disc, a magnetic disk, a semiconductor memory, or other non-transitory tangible information storage media, and the program can be provided through the information storage medium.

In addition, instead of the aspect of providing the program by storing the program in the non-transitory tangible computer-readable medium, a program signal can be provided as a download service using an electric communication line such as the Internet.

Furthermore, a part or all of the processing functions in each of the above apparatuses may be implemented by cloud computing and can be provided as software as a service (SaaS).

Hardware Configuration of Each Processing Unit

A hardware structure of a processing unit that executes various types of processing of the waveform generation unit 172, the autoencoder 50, the loss calculation unit 174, the parameter update amount calculation unit 176, and the parameter update processing unit 178 in the information processing apparatus 170, the controller 302, the waveform generation unit 304, and the image processing unit 306 in the information processing apparatus 300, the data acquisition unit 404, the autoencoder 406, the image processing unit 408, the prediction model 410, and the optimizer 412 in the information processing apparatus 400, and the controller 502, the waveform generation unit 504, the characteristic evaluation unit 506, and the drive waveform determination unit 508 in the information processing apparatus 500 corresponds to, for example, various processors illustrated below.

The various processors include a CPU that is a general-purpose processor functioning as various processing units by executing a program, a GPU, a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of two or more processors of the same type or different types. For example, one processing unit may be composed of a plurality of FPGAs, a combination of a CPU and an FPGA, or a combination of a CPU and a GPU. In addition, a plurality of processing units may be composed of one processor. A first example of a plurality of processing units composed of one processor is, as represented by computers such as a client and a server, a form of one processor composed of a combination of one or more CPUs and software, in which the processor functions as a plurality of processing units. A second example is, as represented by a system on chip (SoC) and the like, a form of using a processor that implements functions of the entire system including a plurality of processing units in one integrated circuit (IC) chip. Accordingly, various processing units are configured using one or more of the various processors as a hardware structure.

Furthermore, the hardware structure of the various processors is more specifically an electric circuit (circuitry) in which circuit elements such as semiconductor elements are combined.

Advantage of Embodiment

According to the above embodiment, the following effects are obtained.

[1] The prediction model 410 that can automatically learn a relationship between the drive waveform and the characteristic through machine learning using the characteristic extracted from the actual flight shape with respect to the combination of the ink to be used and the ink jet head and that can accurately predict the characteristic with respect to an unknown drive waveform can be created.

[2] Even a technician not having professional knowledge with respect to fluid dynamics and computation can create the high-performance prediction model 410 using the image in which the actual flight shape is imaged, by repeating data collection based on experiment.

[3] By automating processing of searching for the drive waveform using the trained prediction model 410, even a technician not having professional knowledge with respect to creation of the drive waveform can create the drive waveform that can implement a certain level of the characteristic.

[4] A drive waveform that matches a purpose of a user can be selected. For example, in the case of emphasizing quality of solid printing, by setting the conditions (target value) to be satisfied with respect to various characteristics in accordance with the purpose such as prioritizing the droplet amount and allowing occurrence of the satellite droplet, the drive waveform suitable for the conditions can be created.

[5] It is possible to make use for evaluating the ink. So far, it has been difficult to rate types of ink based on whether optimization of the drive waveform is good or bad. However, in the technique of the present embodiment, ejection suitability of the ink can be compared based on an indicator such as the number of candidate waveforms with which a preferable flight characteristic is obtained.

[6] A drive waveform with which a high-quality characteristic that is difficult to achieve in drive waveform creation performed by a technician in the related art may be implemented can be found. That is, it is possible to search for a completely unknown drive waveform that is difficult to search for by human effort.

[7] The promising drive waveform can be efficiently created within a small amount of time, compared to that in the drive waveform creation performed by a technician.

[8] A drive waveform having a favorable characteristic can be automatically and efficiently found from an innumerable number of drive waveforms.

[9] In the case of searching for the drive waveform by human effort, only a drive waveform that has a typical property and that is no better than that in the related art can be found. However, in the case of using the automatic search of the present embodiment, it is probable that an unexpected drive waveform that is not attempted by a human being is suggested as a candidate.

Modification Example 1

An example of using the time series image group captured at the certain time interval as the data related to the actual flight shape has been described in the above embodiment. However, for example, one image in which the flight state of the ink after elapse of a predetermined time from application of the drive waveform is imaged can be used instead of the time series image group. It is desirable to set the predetermined time in this case such that the characteristic such as the droplet speed, the droplet amount, a length of the liquid column, and whether or not the satellite droplet is present with respect to the ink can be specified from a position of the ink captured in one image captured at the timing.

As described in the embodiment, by using the time series image group of two or more images at different time points, a more accurate characteristic such as the droplet speed can be perceived, and the prediction model 410 having high prediction accuracy can be created.

Modification Example 2

While an example of the machine learning model that receives input of the coordinates of the drive waveform in the latent space and that outputs the predicted characteristic has been described in the above embodiment, the prediction model is not limited to this example. For example, a prediction model that receives input of the drive waveform and that outputs a predicted flight shape through machine learning using the data set TDS1 in FIG. 13 may be constructed. In this case, optimization of the model parameters of the machine learning model is performed while evaluating an error between the predicted flight shape output by the prediction model and the actual (correct answer) flight shape.

The evaluation value of the droplet amount, the droplet speed, whether or not the satellite droplet is present, and the like may be calculated with respect to the predicted flight shape output by the trained prediction model, and a proper drive waveform may be determined based on the evaluation value.

Apparatus Application Example

While an example of the ink jet apparatus used in ink jet printing has been described in the above embodiment, the application scope of the present invention is not limited to this example. The disclosed technology is applicable to an apparatus that ejects liquid using a piezoelectric type liquid ejection head regardless of a type of the liquid to be used and of application. For example, wide application can be made to liquid ejection apparatuses that draw various shapes or patterns using a functional liquid material (collectively referred to as "liquid"), such as a wiring line drawing apparatus that draws a wiring pattern of an electronic circuit, a manufacturing apparatus of various devices, a resist printing apparatus using resin liquid as functional liquid for ejection, a color filter manufacturing apparatus, and a microstructure forming apparatus that forms a microstructure using a material for material deposition.

Other

The present disclosure is not limited to the above embodiment, and various modifications can be made without departing from the gist of the technical idea of the disclosed technology.

EXPLANATION OF REFERENCES

20: drive waveform
22: preliminary vibration pulse
24: ejection pulse
26: residual effect suppression pulse
50: autoencoder
52: encoder unit
54: decoder unit
100: information processing apparatus
102: processor
104: computer-readable medium
106: communication interface
108: input-output interface
110: bus
112: memory
114: storage
152: input device
154: display device
170: information processing apparatus
172: waveform generation unit
174: loss calculation unit
176: parameter update amount calculation unit
178: parameter update processing unit
200: ink jet apparatus
202: ink jet head
210: ejector
212: nozzle
214: pressure chamber
216: piezoelectric element
218: nozzle flow channel
220: individual supply path
224: supply-side common flow channel
226: vibration plate
228: individual electrode
230: piezoelectric body
232: cover plate
234: movable space
250: drive circuit
300: information processing apparatus
302: controller
304: waveform generation unit
306: image processing unit
308: data storage unit
320: camera
400: information processing apparatus
402: data storage unit
404: data acquisition unit

406: model parameter update unit
408: image processing unit
410: prediction model
412: optimizer
420: information processing apparatus
422: data storage unit
430: information processing apparatus
432: data acquisition unit
500: information processing apparatus
502: controller
504: waveform generation unit
506: characteristic evaluation unit
508: drive waveform determination unit
510: storage unit
CDWk: drive waveform
DWj: drive waveform
FVk: waveform feature
F4A: left drawing
F4B: right drawing
FSj(t): flight shape image group
PFCk: predicted characteristic
PFFj: predicted characteristic
WFi: high-dimensional vector
RWFi: reconfigured vector
TDWj: drive waveform
TFFj: characteristic
TFSj: flight shape
TDS1, TDS2, TDS3: data set
S1 to S8: step of drive waveform creation method

What is claimed is:

1. A drive waveform creation method of creating a drive waveform to be used for driving a piezoelectric element of a liquid ejection head including the piezoelectric element, the drive waveform creation method comprising:

via one or more processors, predicting flight of liquid to be ejected by the liquid ejection head in a case of inputting an unknown drive waveform using a machine learning model that is trained through machine learning using data related to an actual flight shape of the liquid in a case where each of a plurality of drive waveforms is applied to the piezoelectric element using the liquid and the liquid ejection head;

calculating a waveform feature represented by coordinates in a latent space in smaller dimensions than dimensions of the unknown drive waveform from the unknown drive waveform;

causing the trained machine learning model to output a predicted characteristic indicating a flight characteristic of the liquid predicted in a case where the unknown drive waveform is applied by inputting the waveform feature into the trained machine learning model; and determining a drive waveform suitable for ejecting the liquid based on the prediction of the flight including the predicted characteristic.

2. The drive waveform creation method according to claim 1, wherein a parameter of the drive waveform includes at least one of a pulse width, a slope, a pulse height, or a pulse interval.

3. The drive waveform creation method according to claim 1, wherein a learning phase of the machine learning model includes a step of compressing each of the plurality of drive waveforms into the latent space in smaller dimensions than dimensions of the drive waveform.

4. The drive waveform creation method according to claim 3, wherein the drive waveform is converted into coordinates in the latent space by inputting the drive waveform into an autoencoder.

5. The drive waveform creation method according to claim 3, wherein in the learning phase, the machine learning model is trained to predict an evaluation value based on the actual flight shape in a case of applying the drive waveform using a correspondence relationship between the coordinates of each of the plurality of drive waveforms in the latent space and the evaluation value.

6. The drive waveform creation method according to claim 5, wherein the data related to the actual flight shape includes the evaluation value indicating a characteristic extracted from an image in which the actual flight shape is imaged.

7. The drive waveform creation method according to claim 5, wherein the evaluation value includes at least one value indicating a droplet speed, a droplet amount, or whether or not a satellite droplet is present for the liquid ejected from the liquid ejection head.

8. The drive waveform creation method according to claim 5, wherein the prediction of the flight includes prediction of the evaluation value, and the one or more processors are configured to:

generate one or more of the unknown drive waveforms different from the plurality of drive waveforms;

calculate coordinates in the latent space from the unknown drive waveform;

calculate the evaluation value predicted from the coordinates of the unknown drive waveform in the latent space using the machine learning model; and determine a drive waveform satisfying a target value by comparing the evaluation value calculated using the machine learning model and the target value with each other.

9. The drive waveform creation method according to claim 8, wherein the one or more processors are configured to calculate the coordinates in the latent space from the unknown drive waveform using an autoencoder.

10. The drive waveform creation method according to claim 1, wherein the one or more processors are configured to generate a plurality of the unknown drive waveforms different from the plurality of drive waveforms by randomly extracting a value of a parameter of the drive waveform based on a uniform distribution and predict the flight using the machine learning model with respect to each drive waveform.

11. An information processing apparatus that executes the drive waveform creation method according to claim 1, the information processing apparatus comprising:

the one or more processors; and one or more storage devices in which the machine learning model is stored.

12. A non-transitory, computer-readable tangible recording medium which records thereon a program for causing, when read by a computer, the computer to execute the drive waveform creation method according to claim 1.

13. A drive waveform creation method of creating a drive waveform to be used for driving a piezoelectric element of a liquid ejection head including the piezoelectric element, the drive waveform creation method comprising:

via one or more processors, predicting flight of liquid to be ejected by the liquid ejection head in a case of inputting an unknown drive waveform using a machine learning model that is trained through machine learning using data related to an actual flight shape of the liquid in a case where each of a plurality of drive waveforms is applied to the piezoelectric element using the liquid and the liquid ejection head, wherein a learning phase of the machine learning model includes a step of compressing each of the plurality of drive waveforms into a latent space in smaller dimensions than dimensions of the drive waveform, wherein in the learning phase, the machine learning model is trained to predict an evaluation value based on the actual flight shape in a case of applying the drive waveform using a correspondence relationship between coordinates of each of the plurality of drive waveforms in the latent space and the evaluation value, and wherein the machine learning model is a model that outputs an average value and a standard deviation of the evaluation value predicted from the coordinates in the latent space; and determining a drive waveform suitable for ejecting the liquid based on the prediction of the flight.

14. The drive waveform creation method according to claim 13, wherein the one or more processors are configured to:

generate one or more of the unknown drive waveforms different from the plurality of drive waveforms;

calculate coordinates in the latent space from the unknown drive waveform;

calculate the average value and the standard deviation of the evaluation value predicted from the coordinates in the latent space using the machine learning model;

calculate a probability of the evaluation value exceeding a target value from the average value and the standard deviation of the evaluation value calculated using the machine learning model; and determine a drive waveform of which the probability of exceeding the target value is high as a proper drive waveform.

15. An information processing apparatus that executes the drive waveform creation method according to claim 13, the information processing apparatus comprising:

the one or more processors; and one or more storage devices in which the machine learning model is stored.

16. A non-transitory, computer-readable tangible recording medium which records thereon a program for causing, when read by a computer, the computer to execute the drive waveform creation method according to claim 13.

17. A drive waveform creation method of creating a drive waveform to be used for driving a piezoelectric element of a liquid ejection head including the piezoelectric element, the drive waveform creation method comprising:

via one or more processors, predicting flight of liquid to be ejected by the liquid ejection head in a case of inputting an unknown drive waveform using a machine learning model that is trained through machine learning using data related to an actual flight shape of the liquid in a case where each of a plurality of drive waveforms is applied to the piezoelectric element using the liquid and the liquid ejection head, wherein a learning phase of the machine learning model includes a step of compressing each of the plurality of drive waveforms into a latent space in smaller dimensions than dimensions of the drive waveform, wherein in the learning phase, the machine learning model is trained to predict an evaluation value based on the actual flight shape in a case of applying the drive waveform using a correspondence relationship between coordinates of each of the plurality of drive waveforms in the latent space and the evaluation value, and wherein the one or more processors are configured to, in a case of generating a plurality of the unknown drive waveforms different from the plurality of drive waveforms by randomly extracting a value of a parameter of the drive waveform based on a uniform distribution, clarify a relationship between a distance on the latent space and a variance of the evaluation value in advance through variogram analysis and set a search interval of the drive waveform based on the variogram analysis; and determining a drive waveform suitable for ejecting the liquid based on the prediction of the flight.

18. The drive waveform creation method according to claim 17, wherein the search interval is set to be greater than or equal to a distance in which the distance on the latent space and the variance of the evaluation value become uncorrelated with each other based on the variogram analysis.

19. An information processing apparatus that executes the drive waveform creation method according to claim 17, the information processing apparatus comprising:

the one or more processors; and one or more storage devices in which the machine learning model is stored.

20. A non-transitory, computer-readable tangible recording medium which records thereon a program for causing, when read by a computer, the computer to execute the drive waveform creation method according to claim 17.

* * * * *